US011869297B2

(12) United States Patent
Beskitt et al.

(10) Patent No.: US 11,869,297 B2
(45) Date of Patent: Jan. 9, 2024

(54) CASSETTES FOR AN AUTOMATED TRANSACTION MACHINE

(71) Applicant: Diebold Nixdorf, Incorporated, North Canton, OH (US)

(72) Inventors: William Daniel Beskitt, Canton, OH (US); Jasen James Smolk, Ravenna, OH (US); Sean Haney, North Canton, OH (US); Michael J. Harty, Canton, OH (US)

(73) Assignee: Diebold Nixdorf, Incorporated, Hudson, OH (US)

( * ) Notice: Subject to any disclaimer, the term of this patent is extended or adjusted under 35 U.S.C. 154(b) by 70 days.

(21) Appl. No.: 17/621,271

(22) PCT Filed: Jun. 25, 2020

(86) PCT No.: PCT/US2020/039598

§ 371 (c)(1),
(2) Date: Dec. 21, 2021

(87) PCT Pub. No.: WO2020/264147

PCT Pub. Date: Dec. 30, 2020

(65) Prior Publication Data

US 2022/0366753 A1 Nov. 17, 2022

Related U.S. Application Data

(60) Provisional application No. 62/866,558, filed on Jun. 25, 2019.

(51) Int. Cl.
*G07D 11/13* (2019.01)
*G07F 19/00* (2006.01)

(52) U.S. Cl.
CPC .......... *G07D 11/13* (2019.01); *G07F 19/202* (2013.01); *G07F 19/205* (2013.01)

(58) Field of Classification Search
CPC ...... G07D 11/13; G07F 19/202; G07F 19/205
USPC .......................................................... 235/379
See application file for complete search history.

(56) References Cited

U.S. PATENT DOCUMENTS 6,131,809 A 10/2000 Drescher
6,331,000 B1 12/2001 Beskitt
2004/0188921 A1 9/2004 Washington
(Continued)

FOREIGN PATENT DOCUMENTS

EP 2346007 A2 7/2011
KR 1020130101392 A 9/2013
(Continued)

OTHER PUBLICATIONS

International Search Report filed in the corresponding PCT Application dated Oct. 16, 2020; 4 pages.
(Continued)

*Primary Examiner* — Daniel A Hess
(74) *Attorney, Agent, or Firm* — Black McCuskey

(57) ABSTRACT

An automated transaction machine includes a plurality of cassettes of at least two different configurations. A first cassette may include multiple cavities with an internal transport, while a second cassette includes a single cavity. A first cassette may include lid access from both a top and bottom, while a second cassette only includes lid access from a top.

18 Claims, 32 Drawing Sheets

(56) References Cited

U.S. PATENT DOCUMENTS

| | | | | |
|---|---|---|---|---|
| 2007/0013124 | A1* | 1/2007 | Graef | G07F 19/201 271/145 |
| 2014/0190787 | A1 | 7/2014 | Fujita | |
| 2014/0263619 | A1 | 9/2014 | Turocy et al. | |

FOREIGN PATENT DOCUMENTS

| | | | |
|---|---|---|---|
| KR | 101657764 | B1 | 9/2016 |
| WO | 2014065305 | A1 | 5/2014 |

OTHER PUBLICATIONS

Written Opinion filed in the corresponding PCT Application dated Oct. 16, 2020; 10 pages.
International Preliminary Report on Patentability filed in the corresponding PCT Application dated Dec. 28, 2021; 11 pages.
Partial European Search Report dated Jun. 20, 2023; 13 pages.

* cited by examiner

CASSETTES FOR AN AUTOMATED TRANSACTION MACHINE

CROSS-REFERENCE TO RELATED APPLICATIONS

This application is a National Phase filing of International Application Ser. No. PCT/US2020/39598, for CASSETTES FOR AN AUTOMATED TRANSACTION MACHINE, filed 25 Jun. 2020. This application claims priority to and the benefit of U.S. Provisional Patent Application 62/866,558, filed 25 Jun. 2019, the contents of which are hereby incorporated by reference in their entirety.

BACKGROUND

This relates in general to Automated Transaction Machines (ATMs) and systems for automated financial or commercial transactions, including Automated Banking Machines and Automated Teller Machines.

Automated Transaction Machines are commonly used to carry out a variety of financial or commercial transactions. Most commonly, these transactions include dispensing cash, checking account balances, paying bills, and/or receiving deposits from users. ATMs may also perform a variety of other transactions, including the sale and purchase of tickets, issuance of coupons, check or voucher presentation, the printing of script and a variety of other functions.

Automated Transaction Machines often include one or more cassettes for the storage of documents, either to be dispensed or having been deposited. An ATM may contain a plurality of cassettes and this may include a variety of different cassettes, such as for different denominations of currency notes or other notes of value, checks, or other suitable items.

SUMMARY

This relates more particularly an Automated Transaction Machine including a plurality of cassettes, and the specific cassettes.

In at least one embodiment, an automated transaction machine includes a secure chest, a core module including a plurality of commonly configured cassette bays disposed in the chest, a first cassette of a first configuration disposed in one of the plurality of cassette bays, and a second cassette of a second configuration disposed in an other of the plurality of cassette bays.

The first cassette may define upper and lower cavities for the storage of documents, and may include an internal transport disposed between a bottom of the first cassette and a floor of the upper cavity for conveyance of documents to and from the lower cavity.

The bottom of the first cassette may include a hinged bottom lid portion to provide access to the internal transport.

The second cassette may defines a cavity for the storage of documents, and second cassette may further include an internal space for the storage of documents disposed between a bottom of the second cassette and a floor of the cavity of the second cassette.

The bottom of the second cassette may be a hinged bottom lid or include a hinged bottom lid portion to provide access to the internal space.

The first cassette may form a shell including a top, a bottom, a right side, a left side, front end, and a rear end, where at least one cavity is defined within the first cassette, where the top of the first cassette is a top lid to provide access to the cavity of the first cassette, and where the bottom includes at least a hinged bottom lid portion to provide access to at least a portion of the interior of the first cassette from the bottom.

The second cassette may form a shell including a top, a bottom, a right side, a left side, front end, and a rear end, where at least one cavity is defined within the second cassette, where the top of the second cassette is a top lid to provide access to the cavity of the second cassette, and where the bottom of the second cassette is a generally fixed bottom panel.

The first cassette may be a single cavity cassette and the second cassette may be a dual cavity cassette.

In at least one embodiment a cassette for an automated transaction machine for accepting and dispensing documents includes a shell including a top, a bottom, a right side, a left side, front end, and a rear end, where an upper cavity and a lower cavity are defined within the cassette, and where a slot for the passage of documents between the inside and outside of the cassette is formed in the front end, an upper push plate disposed in the upper cavity for urging documents disposed therein toward the slot, an lower push plate disposed in the lower cavity for urging documents disposed therein toward the slot, an upper pathway including an upper feed wheel and an upper stripper wheel for traversing documents in and out of the upper cavity, a lower pathway including a lower feed wheel and a lower stripper wheel for traversing documents in and out of the lower cavity, where the cassette defines a throat between the slot and a gate for selectively connecting the upper pathway and the throat and the lower pathway and the throat, and an internal transport disposed between the bottom and a floor of the upper cavity for conveyance of documents to and from the lower cavity.

The cassette may include a pinch shaft having pinch wheels disposed there on disposed in the throat proximate the slot.

The cassette may include a take-away wheel disposed behind the gate.

The cassette may include a handle formed in the front end of the cassette.

At least one of the upper and lower push plates may be spring biased.

At least one of the upper and lower push plates may be motorized.

The cassette may include a solenoid for selectively switching the gate.

The bottom may include a hinged bottom lid or lid portion to provide access to the internal transport.

In at least one embodiment a cassette for an automated transaction machine for accepting documents includes a shell including a top, a bottom, a right side, a left side, front end, and a rear end, where a cavity is defined within the cassette, and where a slot for the passage of documents between the inside and outside of the cassette is formed in the front end, an internal space for the storage of documents disposed between the bottom and a floor of the cavity, and where the cassette defines a throat between the slot and a gate for selectively connecting the pathway and the throat and the internal space and the throat.

The cassette may include a push plate disposed in the cavity for urging documents disposed therein toward the slot, The cassette may include a pathway including a feed wheel and a stripper wheel for traversing documents in and out of the cavity.

The bottom may be a hinged bottom lid or lid portion to provide access to the internal space.

Various aspects will become apparent to those skilled in the art from the following detailed description and the accompanying drawings.

DETAILED DESCRIPTION

Figure 1:
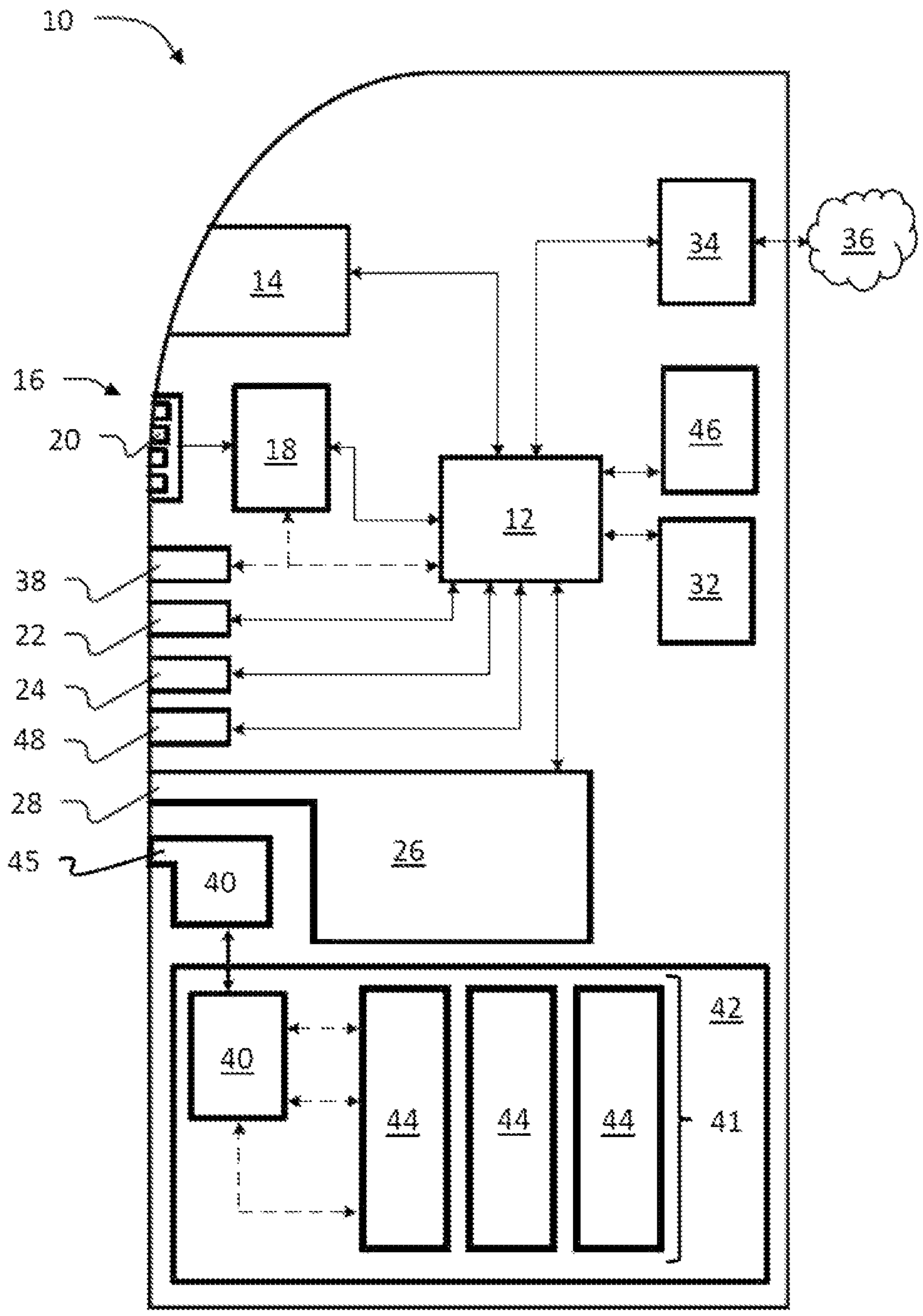
FIG. 1 is a schematic cross-section of an ATM.
Figure 2:
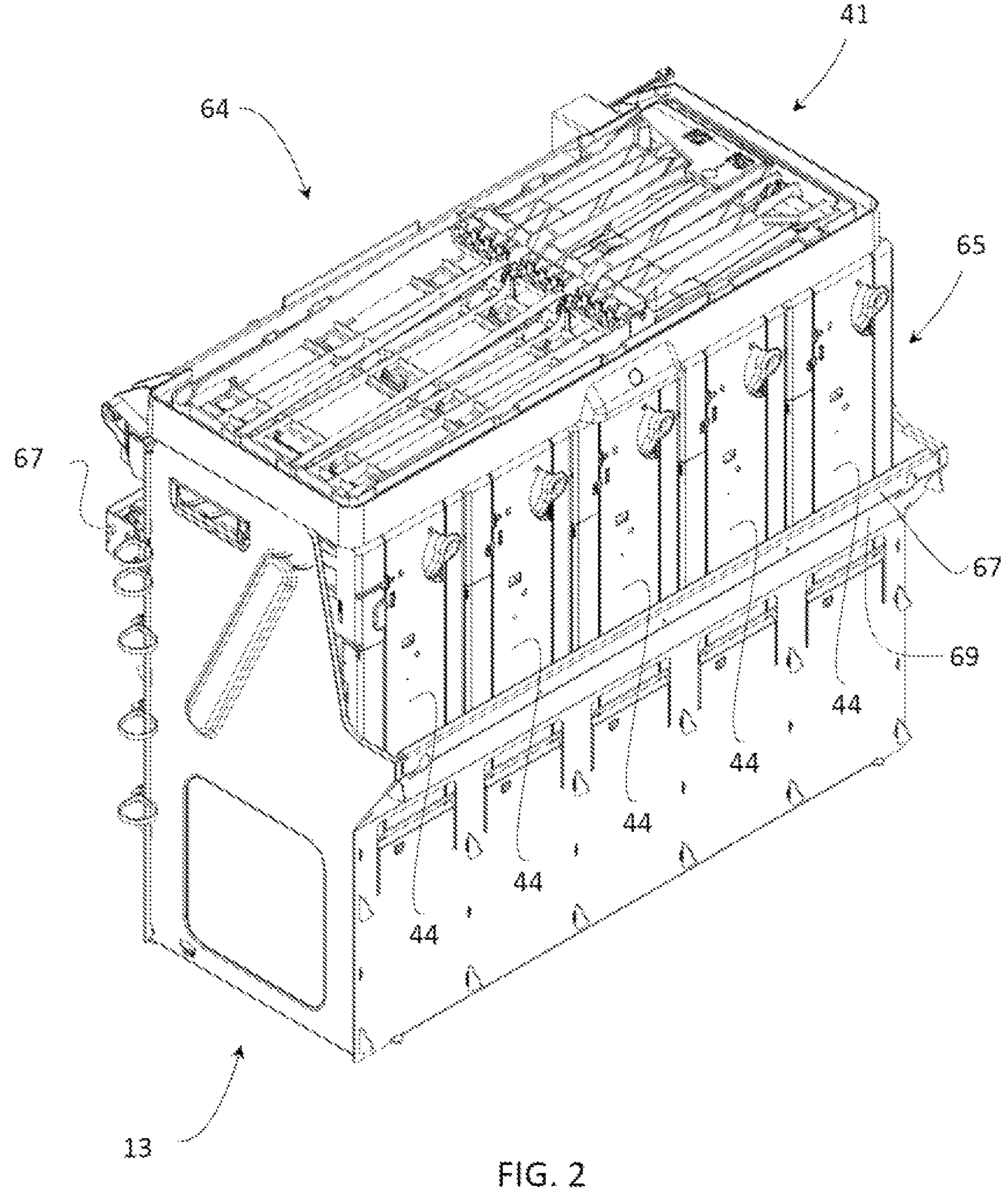
FIG. 2 is a rear right perspective view of the core module of FIG. 1.
Figure 3:
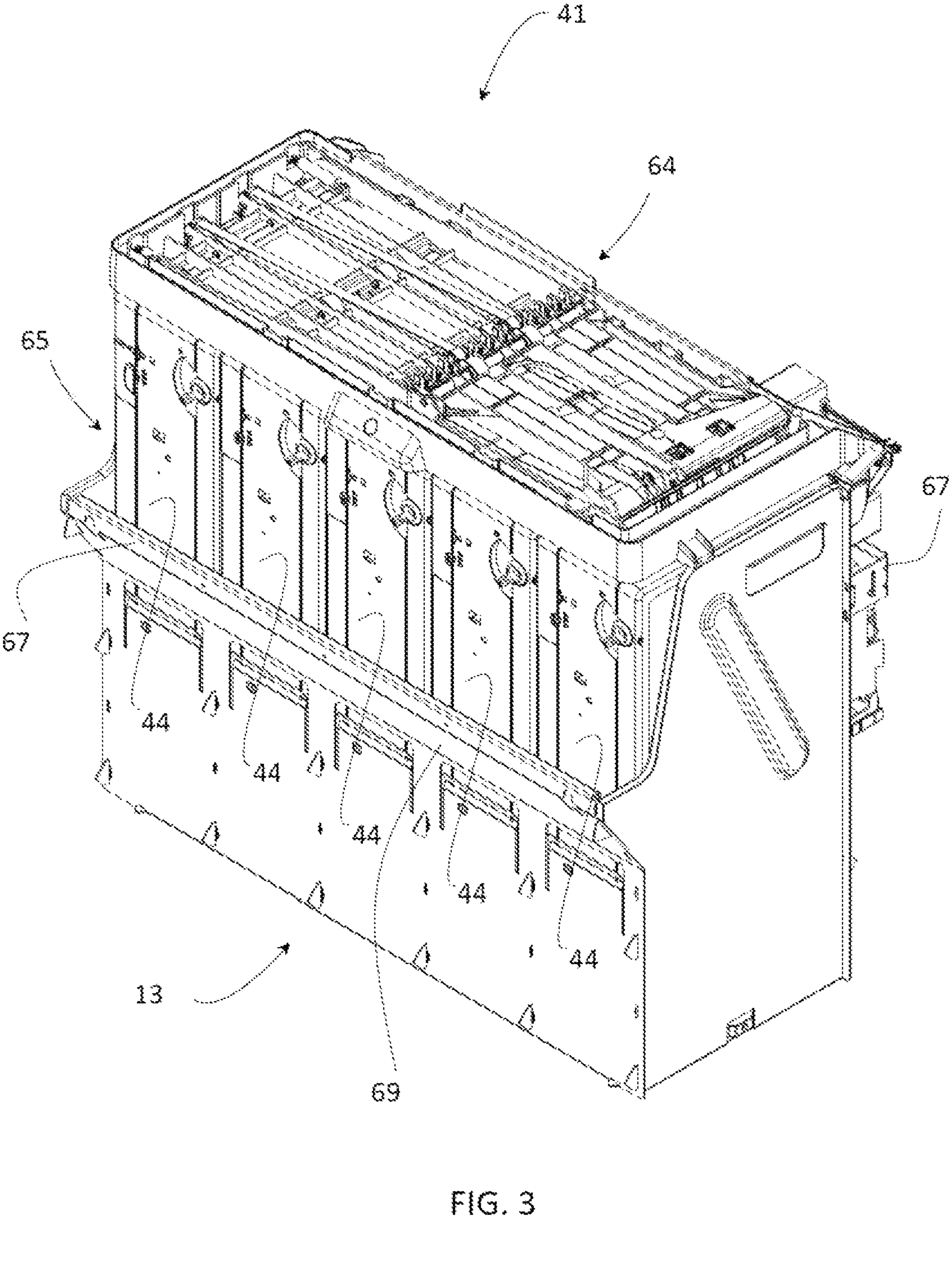
FIG. 3 is a front right perspective view of the core module of FIG. 1.
Figure 4:
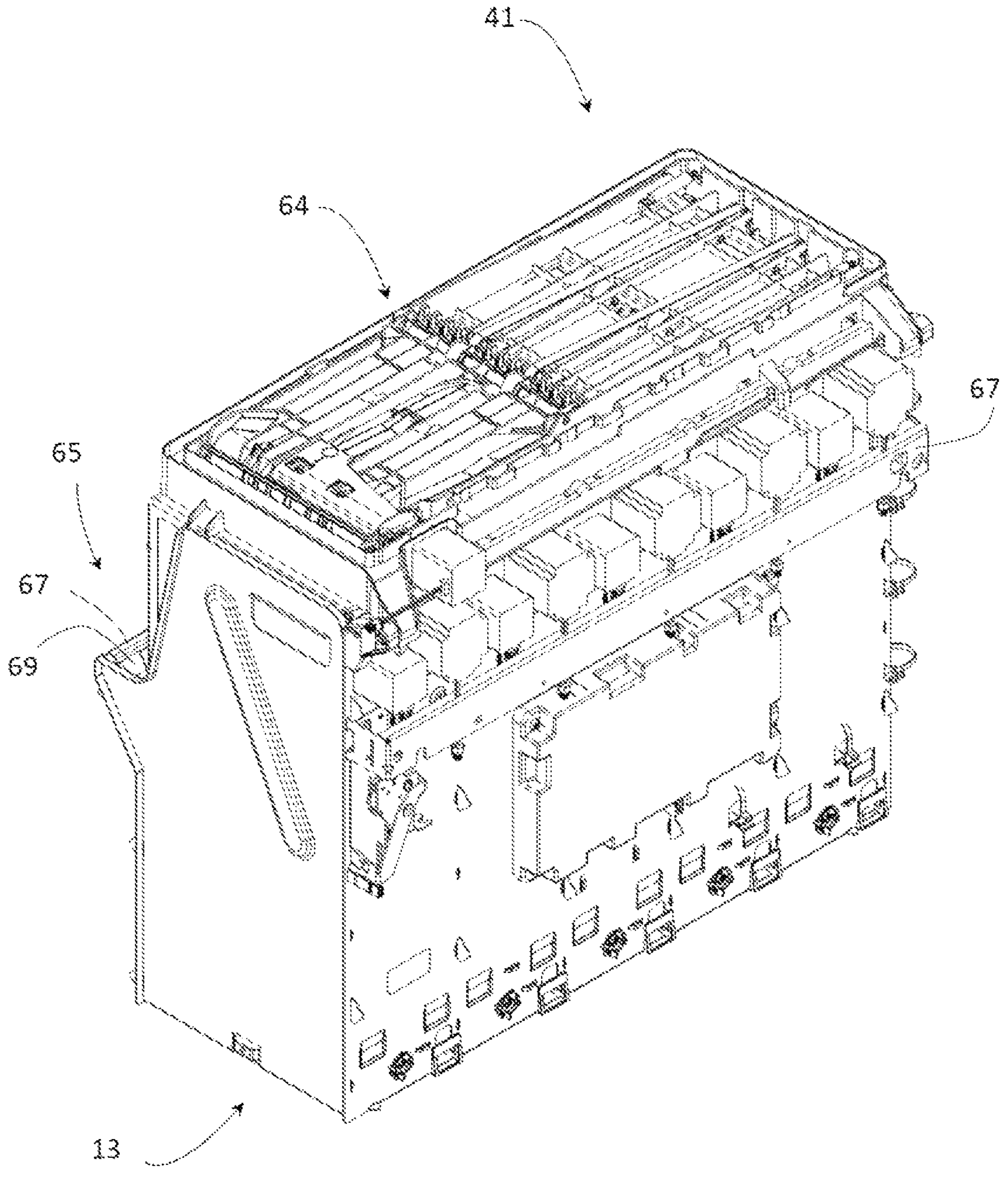
FIG. 4 is a front left perspective view of the core module of FIG. 1.
Figure 5:
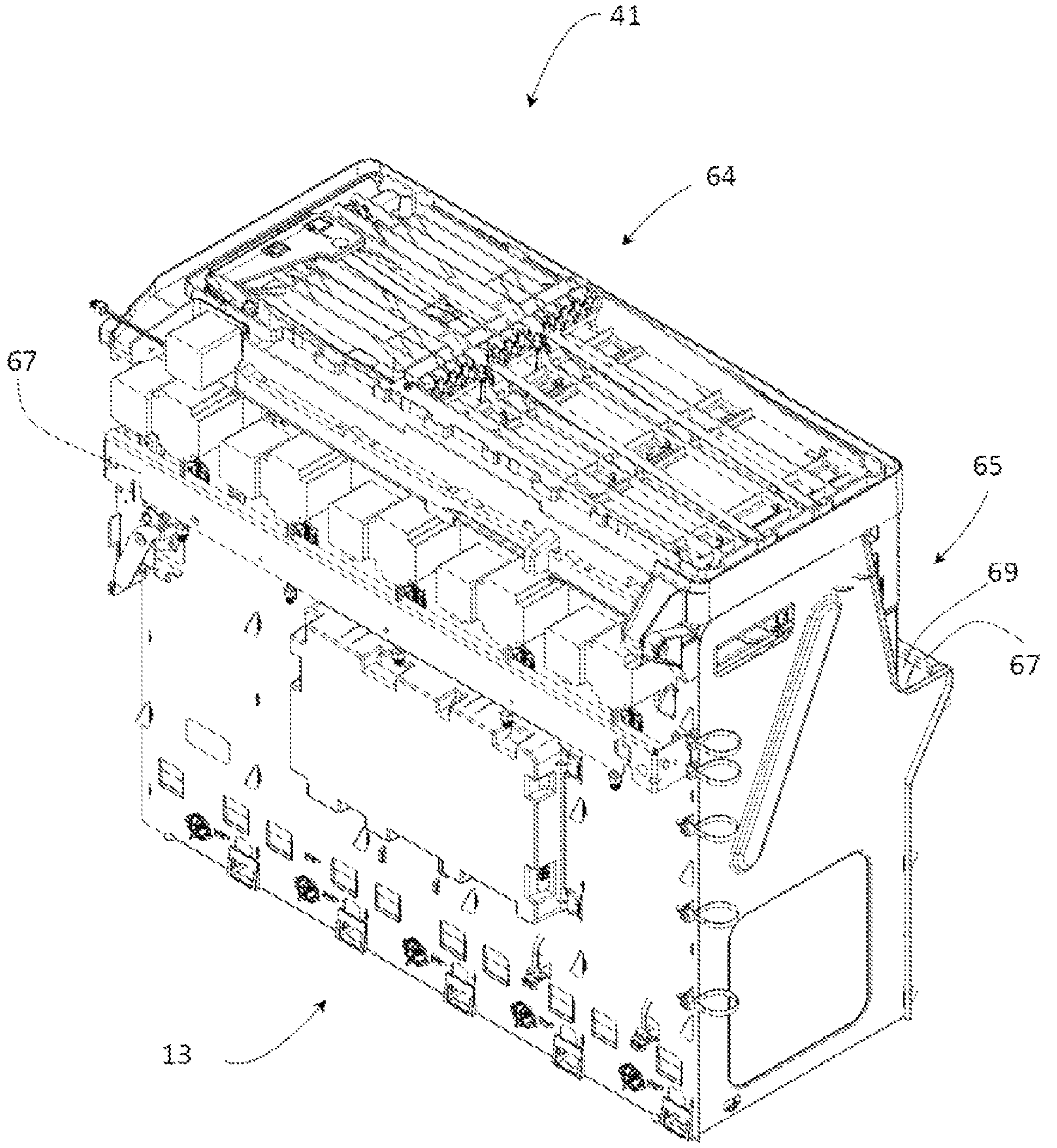
FIG. 5 is a rear-left perspective view of the core module of FIG. 1.

Referring now to the drawings, there is illustrated in FIG. 1 a functional block diagram of an exemplary ATM 10 according to one or more implementations of the present disclosure. The ATM 10 includes different structures and subsystems for receiving input from a user and executing transactions. The ATM 10 includes a computing device 12. The exemplary computing device 12 has one or more processors and a non-transitory, computer readable medium. The computing device 12 operates under the control of an operating system, kernel and/or firmware and executes or otherwise relies upon various computer software applications, components, programs, objects, modules, data structures, etc. The exemplary computing device 12 can operate under the control of the Windows® operating system. The computer readable medium (memory) of the computing device 12 can include random access memory (RAM) devices comprising the main storage of computing device 12, as well as any supplemental levels of memory, e.g., cache memories, non-volatile or backup memories (e.g., programmable or flash memories), read-only memories, etc. In addition, the memory may be considered to include memory storage physically located elsewhere from RAM in the computing device 12, such as any cache memory in a processor, as well as any storage capacity used as a virtual memory. The computing device 12 can also include one or more mass storage devices, e.g., a floppy or other removable disk drive, a hard disk drive, a direct access storage device (DASD), an optical drive (e.g., a CD drive, a DVD drive, etc.), and/or a tape drive, among others, represented by memory 46.

The exemplary ATM 10 also includes a display 14. The computing device 12 can control the display 14 to present information to the user for furthering completion of the transaction. The display 14 can be a touch screen that allows the user to enter information through the display 14. The exemplary display 14 is configured to transmit any user-entered information to the computing device 12.

The exemplary ATM 10 also includes a keypad 16 and an encryption module 18. Generally, the combination of a keypad and an encryption module are referred to in the art as an encrypted pin pad (EPP). The exemplary keypad 16 includes a plurality of keys, such as key 20. The exemplary encryption module 18 has one or more processors and a non-transitory, computer readable medium. The user can press the keys of the keypad 16 to enter a Personal Identification Number (PIN). The keypad 16 is placed in communication with the encryption module 18 and therefore the numbers of the PIN are received by the encryption module 18. It is noted that the communication of the PIN is direct and secure; the PIN cannot be intercepted between the keypad 16 and the encryption module 18. The PIN is then encrypted by the encryption module 18 to define a PIN block. The encryption module 18 includes a network encryption key and applies the network encryption key to encrypt the PIN to the PIN block. The exemplary encryption module 18 is configured to transmit the PIN block to the computing device 12, which can direct the PIN block away from the ATM 10 during the completion of a financial transaction.

The exemplary ATM 10 also includes a card reader 22. The card reader 22 can receive a token from the user, such as a card. The card reader 22 can be configured to execute read and write operations with respect to any storage medium fixed to the user's card. The exemplary card reader 22 can be configured to read data from a magnetic strip on the back of a card or a chip embedded in the card. The exemplary card reader 22 can be configured to transmit any data read from the user's card to the computing device 12, which can direct the data read from the card away from the ATM 10 during completion of a financial transaction. The exemplary card reader 22 can also be configured to receive commands and data from the computing device 12 and change data stored on the user's card.

The exemplary ATM 10 also includes a printer module 24. The computing device 12 can control the printer module 24 to print a receipt when a transaction has been completed. The printer module 24 can communicate one or more messages to the computing device 12, such as a maintenance message regarding the need to refill printer paper.

The exemplary ATM 10 also includes an article exchange unit 26. In the exemplary embodiment, the article exchange unit 26 is configured to receive items such as checks. An exemplary article exchange unit 26 can include a drum on which received items are stored. The exemplary article exchange unit 26 includes a slot 28 open to an exterior of the ATM 10 for the receipt of such items. In other embodiments of the present disclosure, an article exchange unit can be configured to facilitate the receipt of other items, different than paper. The article exchange unit 26 can include one or more sensors and transmit signals from any such sensors to the computing device 12 to execute an exchange. The computing device 12 can control the article exchange unit 26 in response to such signals. For example, the article exchange unit 26 can include a sensor that detects receipt of an item such as a check. The article exchange unit 26 can include a further sensor in the form of a scanner that generates an image of the received item and transmits the image to the computing device 12. When an exchange involves the dispensation of an article to the user, the computing device 12 can control the article exchange unit 26 to dispense the item(s) requested by the user.

The exemplary ATM 10 also includes an access module 32. The access module 32 can be positioned proximate to a rear side of the ATM 10. The access module 32 can be utilized by service and support technicians. For example, the access module 32 can be utilized by a field engineer to complete software updates to the computing device 12. The access module 32 can also be utilized when non-software updates and maintenance is performed, such as the refilling of printer paper or currency.

The exemplary ATM 10 also includes a transceiver 34. The exemplary transceiver 34 is configured to facilitate communication between the computing device 12 and other computing devices that are distinct from and physically remote from the computing device 12. An example of such a remote computing device is a server computing device, such as a banking or financial institution server communicating with a plurality of ATMs. The exemplary transceiver 34 places the computing device 12 in communication with one or more networks, such as network 36. The network 36 can be a local area network (LAN), a wide area network (WAN) such as the Internet, a Multi-protocol label switching (MPLS) network, a cellular network such as operated by cellular phone companies, or any combination thereof. The network 36 can be a financial/bank network such as NYCE, PULSE, PLUS, Cirrus, AFFN, Interac, Interswitch, STAR, LINK, MegaLink, or BancNet. The transceiver 34 can transmit data and requests for input generated by the computing device 12 and receive responses to these requests, directing these responses to the computing device 12.

The exemplary ATM 10 also includes a transceiver 38. The exemplary transceiver 38 is configured to facilitate communication between at least one of the encryption module 18 and the computing device 12 and other computing devices that are distinct from and physically proximate to the ATM 10. An example of such a proximate computing device is a smartphone possessed by the user. The dashed connection lines in FIG. 1 represent optional interconnections. The exemplary transceiver 38 can place the user's smartphone in communication with the encryption module 18, the computing device 12, or both. The exemplary transceiver 38 can implement various communication protocols. For example, the transceiver 38 can be a Near Field Communication (NFC) device. Alternatively, the transceiver 38 can be a Bluetooth beacon. The transceiver 38 can transmit and receive data and requests for input generated by the encryption module 18 and/or the computing device 12, such transmissions occurring with the user's smart phone for example.

The exemplary ATM 10 also includes a scanner 48. The scanner 48 can scan, for example, at least a portion of a display of a smart phone and communicate the scanned display to the computing device 12. A token can be displayed on the display of the smart phone and thus scanned by the scanner 48. The token can be a bar code, a quick response (QR) code, a number, a string of alphanumeric characters, a weblink, or some other symbolic indicia. The exemplary scanner 48 is configured to transmit any scanned data to the computing device 12, which can direct the scanned away from the ATM 10 during completion of a financial transaction.

The exemplary ATM 10 also includes a secure chest or safe 42 for the storage of notes of value or other documents. The ATM 10 further includes a transport system 40 for the transport of notes or other documents. The transport system 40 may include components in the safe 42 or in other portions of the ATM 10. The transport system 40 can dispense banknotes, such as currency and or accept deposits items, such as currency.

There is a core module 41 disposed in the safe 42 which includes one or more cassettes or cash boxes 44 and may include portions of the transport system 40. Banknotes or other documents are stored in the cassettes 44 for disbursement to a user of the ATM 10 or on deposit from a user of the ATM 10. The exemplary transport system 40 can extract or deposit the banknotes or other documents to and from one or more of the cassettes 44 and direct them in or out of the ATM 10 through a slot or other opening 45. The exemplary transport system 40 can communicate with and be controlled by the computing device 12 for at least some operations. Each of the cassettes 44 can engage the transport system 40 through a dispenser mechanism 64 (see FIGS. 2-8) whereby the functioning of the cassettes is controlled. Further, each of the cassettes 44 and the transport system 40 can include mating connectors of any form. Further, the ATM may include a system whereby a proper placement and/or interconnection or components, including the cassettes 44, may be confirmed. In such a case, it may be that when one or more of the cassettes 44 and the transport system 40 are not properly interconnected, a signal or lack thereof can be communicated to the computing device 12 whereby an error message is generated or the ATM 10 can be disabled.

FIGS. 2-8 further illustrate an embodiment of the core module 41.

In more than one embodiment, the Automated Transaction Machine 10 may be configured in a front load, rear load, or through the wall configuration.

In at least one embodiment, a hanger support system is mounted to the safe 42 and a core module 41 includes a lower tray 13 supported by the hanger support. The plurality of cassettes 44 is disposed in the lower tray 13, and the dispenser mechanism 64 of the core module 41 engages the cassettes 44 for the transport of documents between the cassettes 44 and the exterior of the safe 42.

In at least one embodiment, the hanging support 61 is a moveable support and the core module 41 is moveable between a stowed position disposed in the secured area 42 and another position disposed at least partially outside the secure area 42, for example extending through the safe opening when a door of the safe 42 is in an open position.

In at least one embodiment, the lower tray 13 defines a cavity 65 in which the plurality of cassettes 44 are disposed, and the lower tray 13 includes a pair of support rails 67 for engagement with the hanger support where at least one rail 67 is spaced from the cavity 65 by a sloped guide surface 69. In operation, the sloped guide surface 69 assists in the placement of the cassettes 44 in that as the cassettes 44 are inserted into the cavity 65 they may be guided into position by the sloped guide surface 69.

In at least one embodiment, the guide rails 67 are offset in vertical displacement with one of the guide rails 67 with the sloped guide surface 69 being lower than the other guide rail 67.

Figure 6:
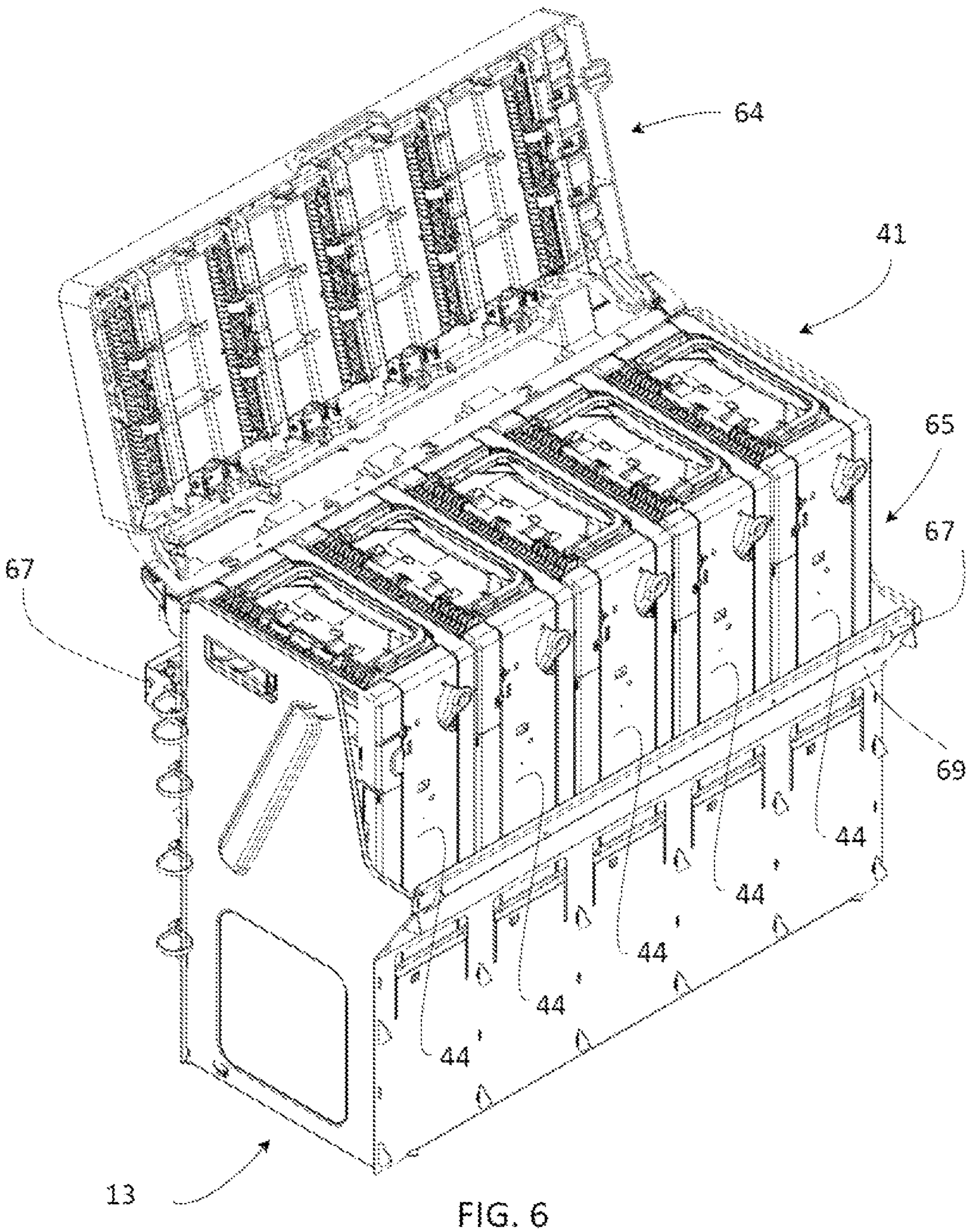
FIG. 6 is a view similar to FIG. 2 except showing the dispenser mechanism in an open position.
Figure 7:
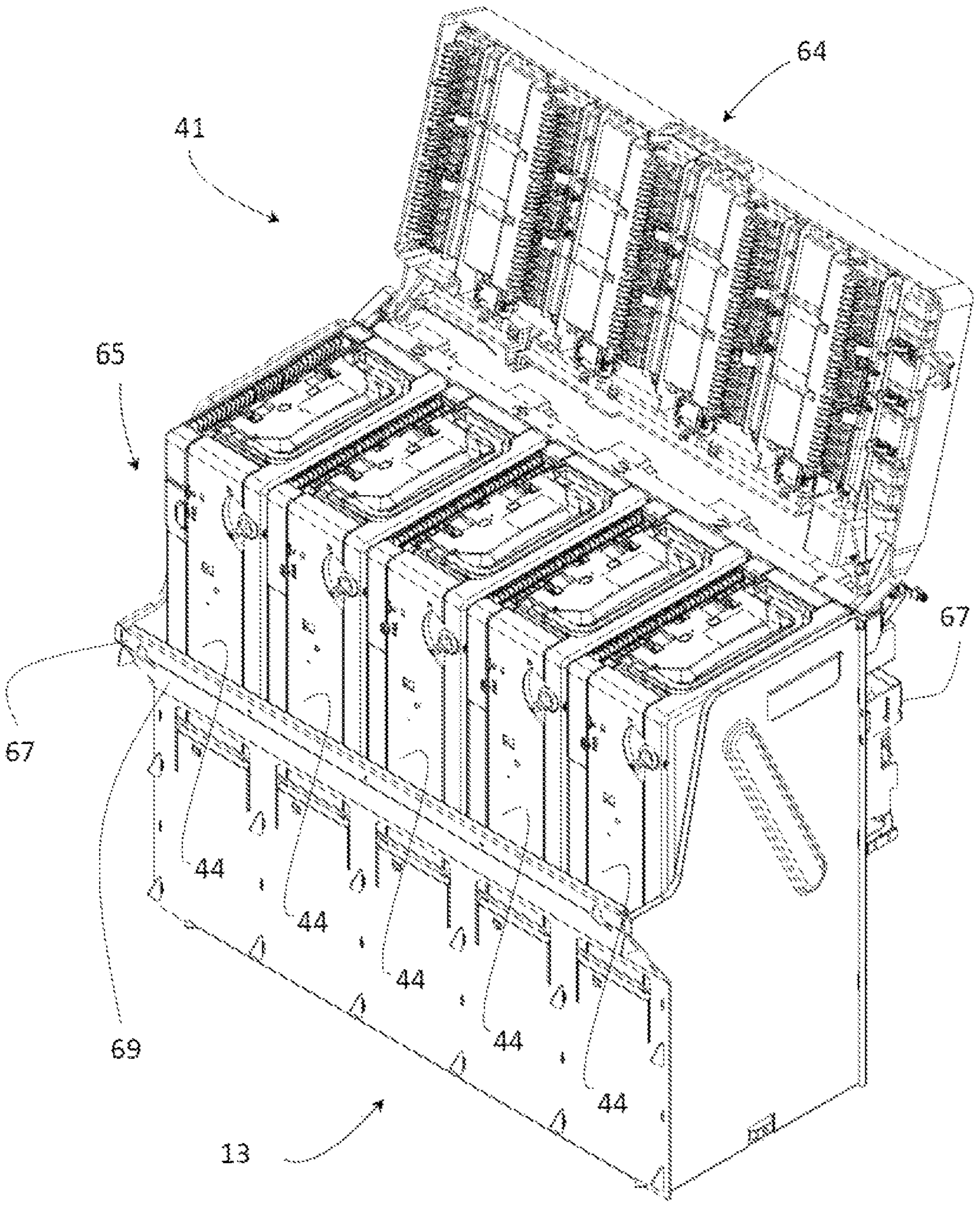
FIG. 7 is a view similar to FIG. 3 except showing the dispenser mechanism in an open position.
Figure 8:
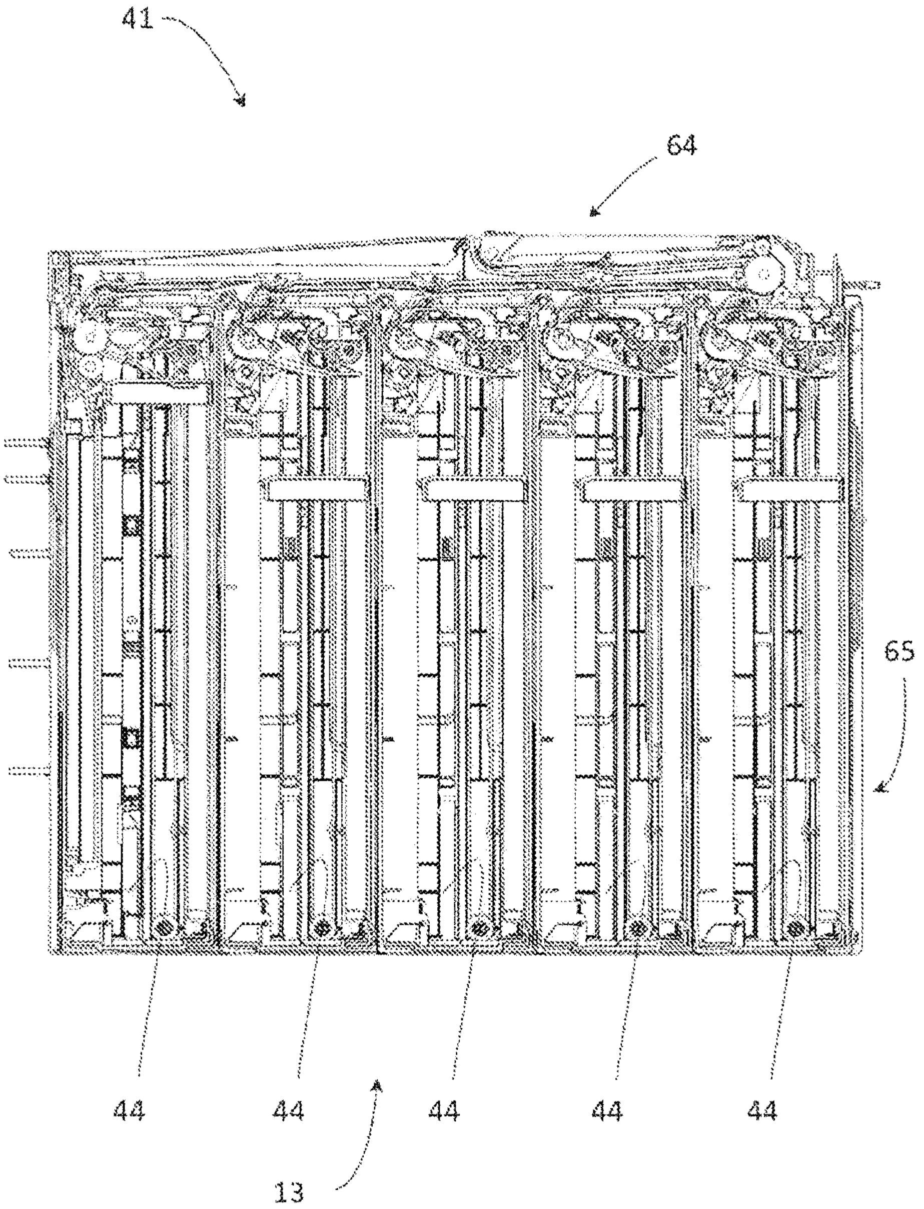
FIG. 8 is a partial right cross-sectional view of the core module of FIG. 1.
Figure 9:
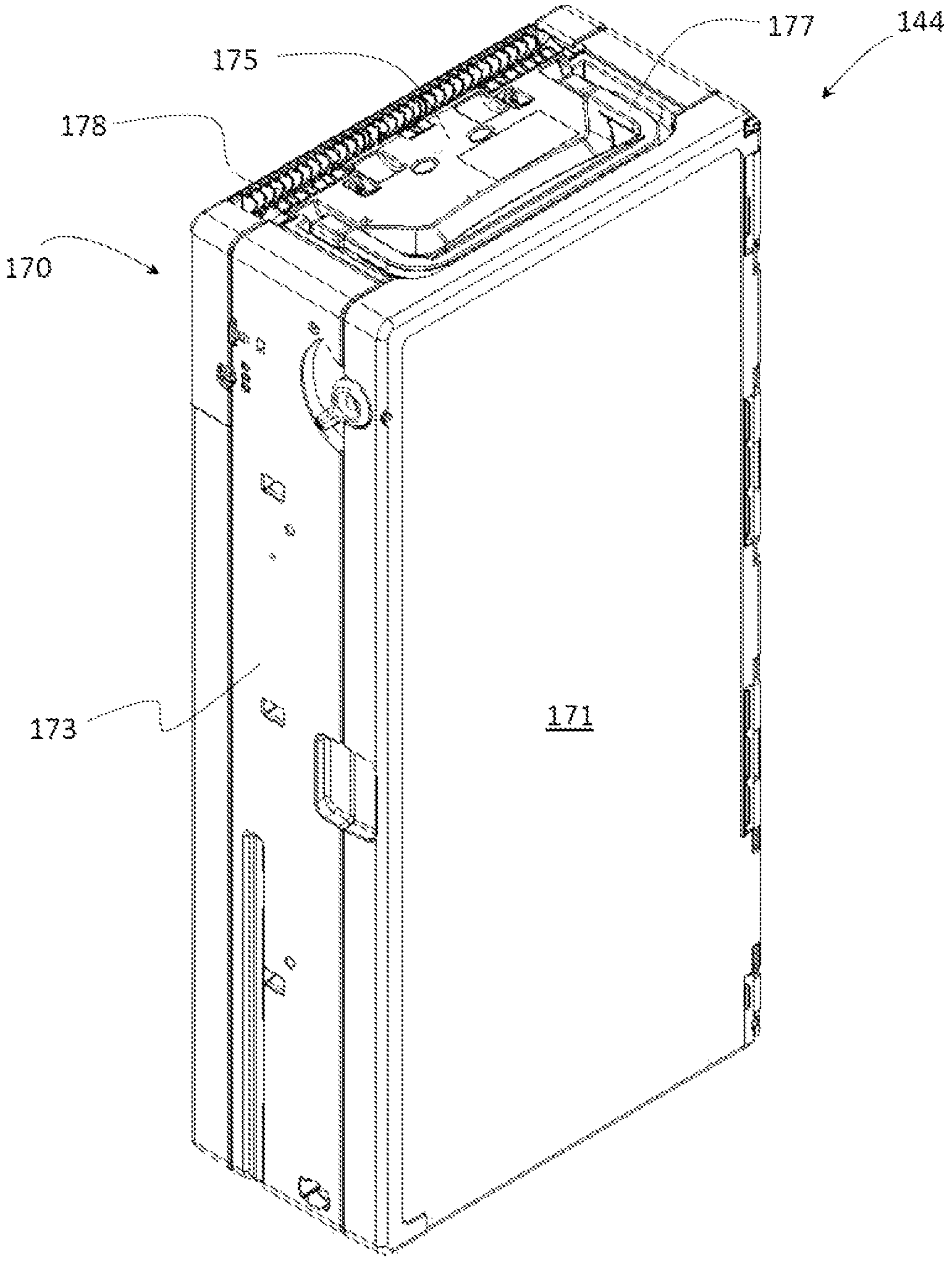
FIG. 9 is a top right perspective view of a first embodiment of a cassette of ATM of FIG. 1.
Figure 10:
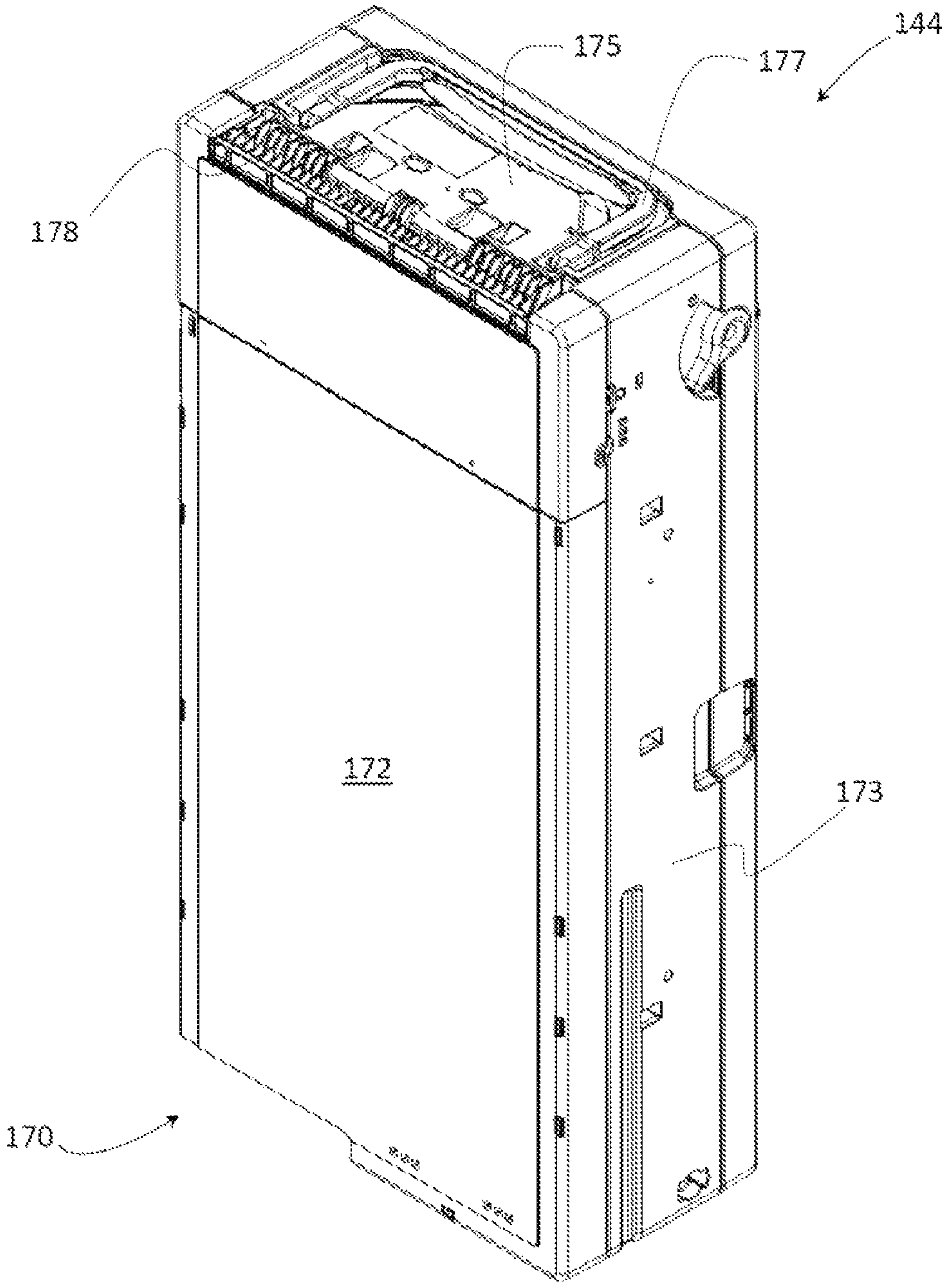
FIG. 10 is a bottom right perspective view of the cassette of FIG. 9.
Figure 11:
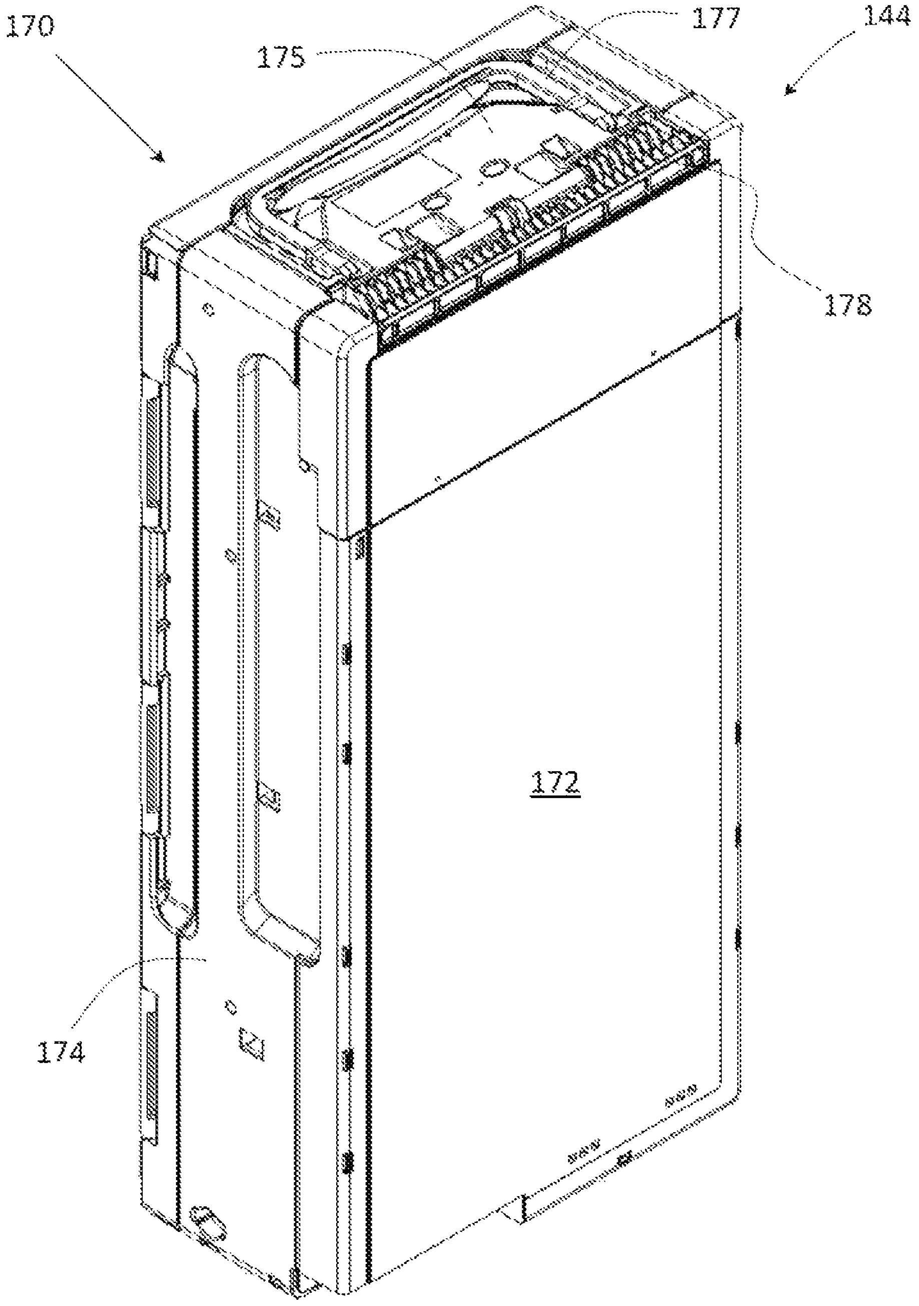
FIG. 11 is a bottom left perspective view of the cassette of FIG. 9.
Figure 12:
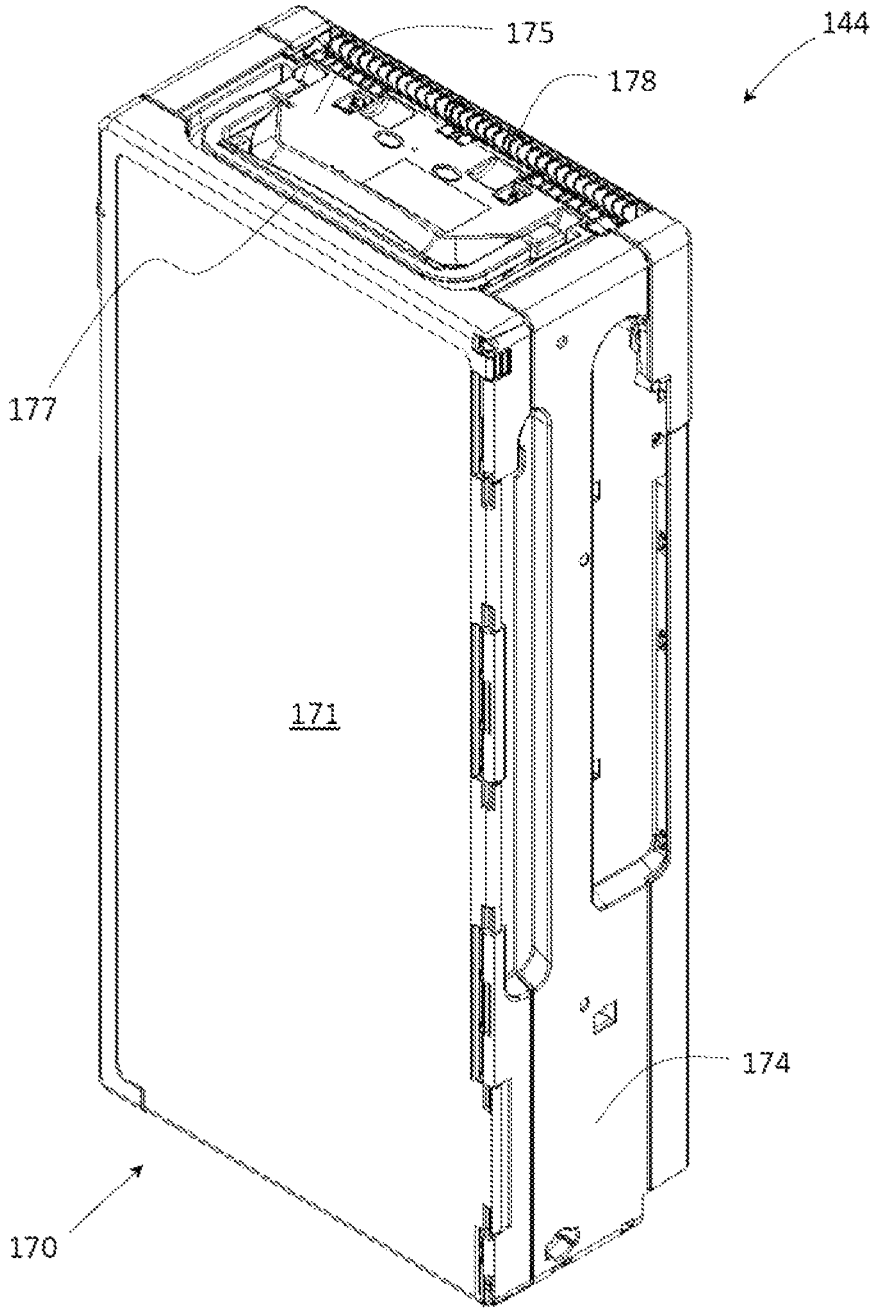
FIG. 12 is a top left perspective view of the cassette of FIG. 9.
Figure 13:
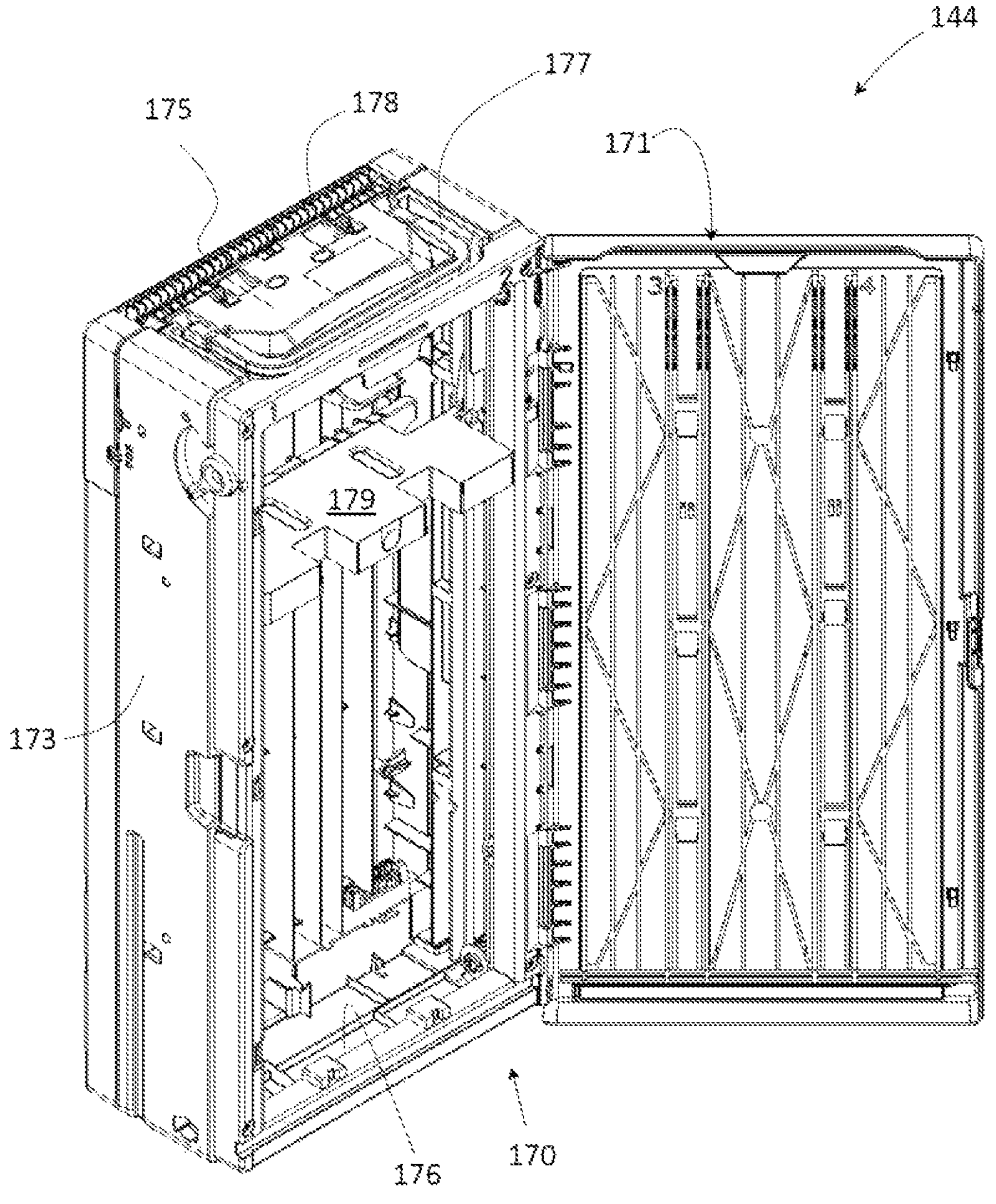
FIG. 13 is a view similar to FIG. 9 except showing the top lid in an open position.
Figure 14:
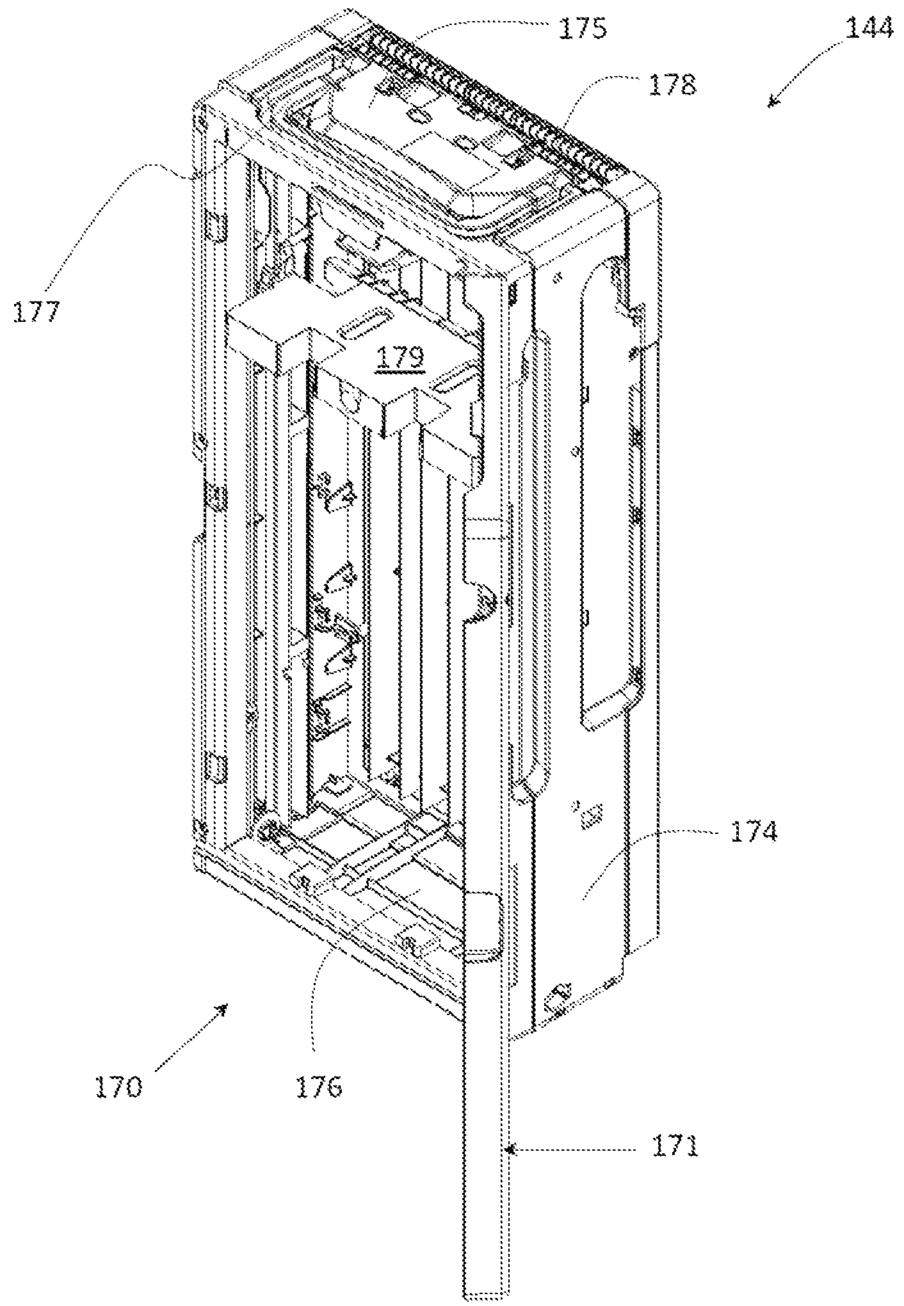
FIG. 14 is a view similar to FIG. 12 except showing the top lid in an open position.

In further example, in the illustrated embodiment, the dispenser mechanism 64 is hinged to the lower tray 13 such that the dispenser mechanism 64 hinges open away from the lower guide rail 67 with the sloped guide surface 69, as shown in FIGS. 6 and 7, such as to further enable insertion of the cassettes 44.

FIGS. 9-15 illustrate a first embodiment of a cassette 144 for use in the ATM 10.

The cassette 144 has a shell 170 including a top 171, a bottom 172, a right side 173, a left side 174, a front end 175 and a rear end 176. The cassette 144 is operable to both dispense or accept notes or other documents. Thus, the cassette 144 may be referred to and an In-Out Cassette, a Recycling Cassette, or a Two-Way Cassette.

The front end 175 includes an optional handle 177 and there is a slot 178 formed in the front end 175 to provide for the passage of notes or other documents between the inside and outside of the cassette 144.

The cassette 144 defines an internal cavity for the storage of notes or other documents. A push plate 179 for urging the documents toward the slot 178 is disposed in the cavity. The push plate 179 may be spring biased, motorized, or both. In this embodiment, the top 171 is a hinged top lid to provide access to the internal cavity.

Figure 15:
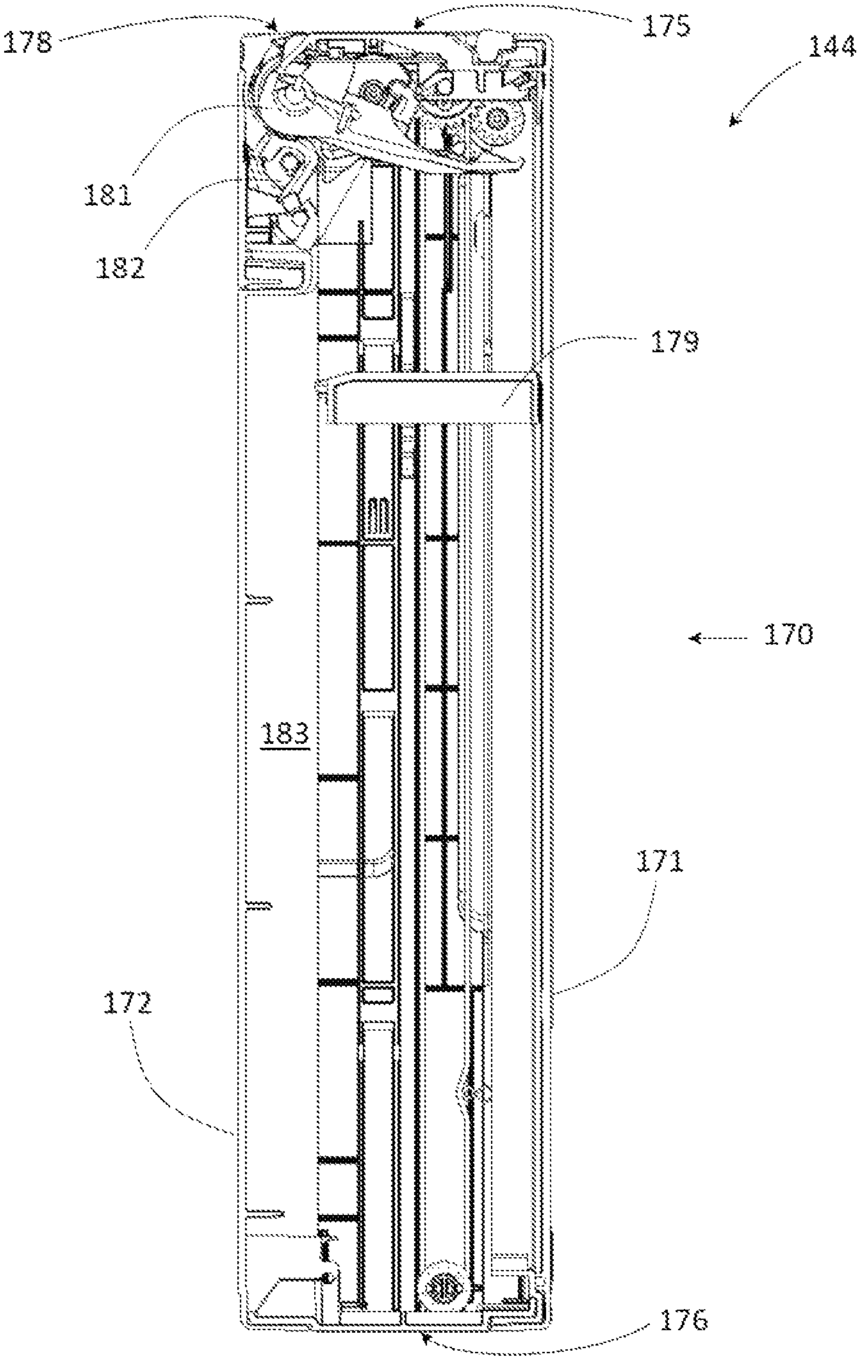
FIG. 15 is a right cross-sectional view of the cassette of FIG. 9.
Figure 16:
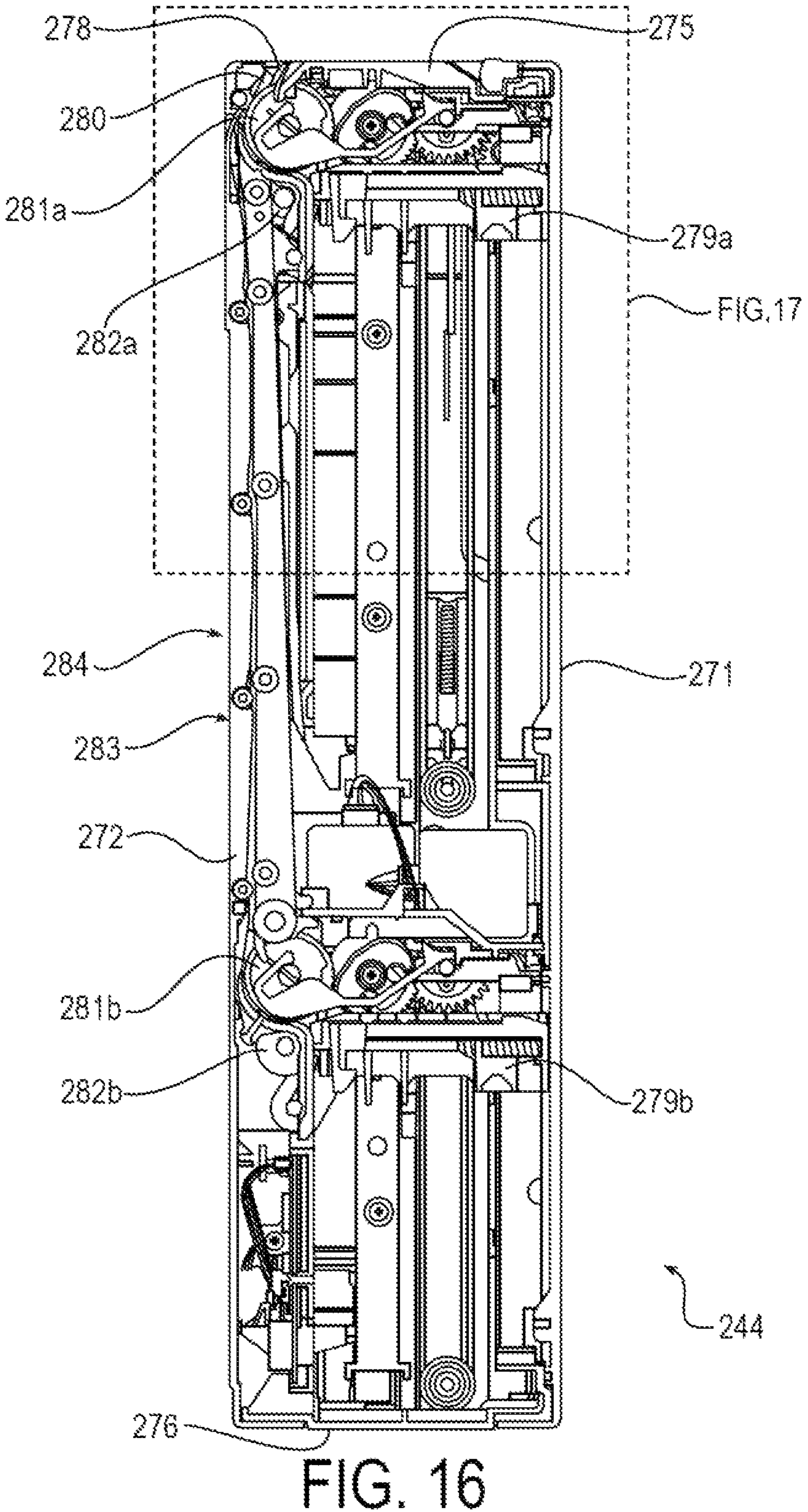
FIG. 16 is a right cross-sectional view similar to FIG. 15 of a second embodiment of a cassette of the ATM of FIG. 1.
Figure 17:
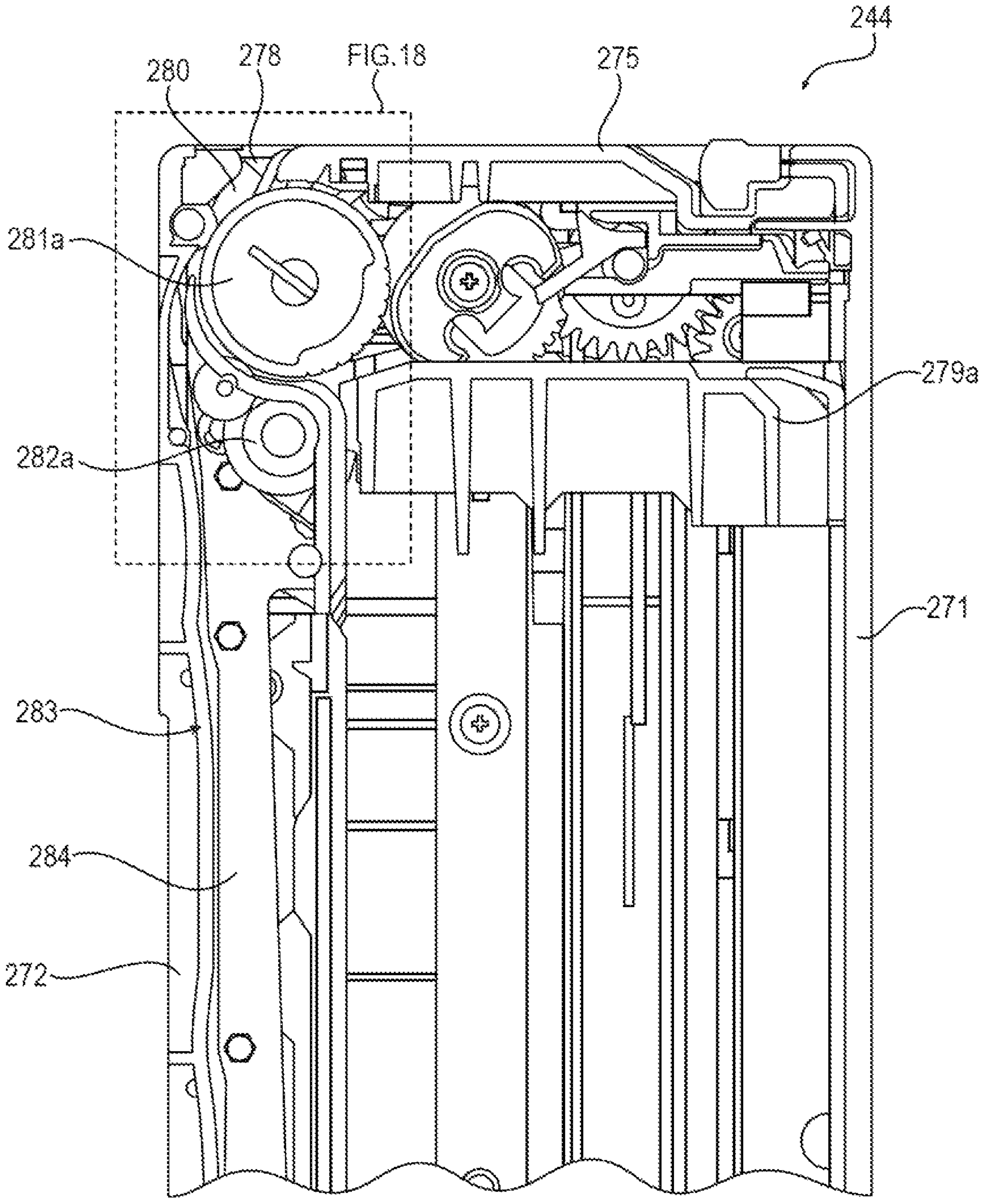
FIG. 17 is an enlarged portion of FIG. 16.

A pathway for the notes or documents to traverse between the cavity and the slot 178 includes a throat, a feed wheel 181, and a stripper wheel 182 among other components shown in FIG. 15.

It is noted that the cassette 144 defines a space 183 between the bottom 172 and a floor of the internal cavity.

FIGS. 16-20 illustrate a second embodiment of a cassette 244 for use in the ATM 10. The cassette 244 of the second embodiment has an exterior generally similar to the exterior of the cassette 144 of the first embodiment as illustrated in FIGS. 9-12. The cassettes 144 and 244 are both configured to be disposed in the core module 41 and operate with the ATM 10.

The cassette 244 defines two separate internal cavities, an upper cavity, and a lower cavity. A first push plate 279*a* is disposed in the upper cavity and a second push plate 279*b* is disposed in the lower cavity. The push plates 279*a* and 279*b* are operable to urge notes or other documents disposed in the cavities toward a slot 278. The push plates 279*a* and 279*b* may be spring biased, motorized, or both. In this embodiment, a top 271 of the cassette 244 is a hinged top lid to provide access to the upper and lower cavities.

There is an internal transport 284 disposed in a space 283 formed between a bottom 272 and a floor of the upper cavity. The internal transport 284 is capable of transporting notes or other documents between an upper end 275 and towards a lower end 276 of the cassette 244.

At an upper end of the internal transport 284 is an upper pathway for the notes or documents to traverse between the cavity and the slot 278. The upper pathway includes an upper feed wheel 281*a*, and an upper stripper wheel 282*a* among other components shown in FIGS. 16 and 17.

At a lower end of the internal transport 284 is a lower pathway for the notes or documents to traverse between the lower cavity and the slot 278. The lower pathway includes a lower feed wheel 281*b*, and a lower stripper wheel 282*b* among other components shown in FIG. 16.

Figure 18:
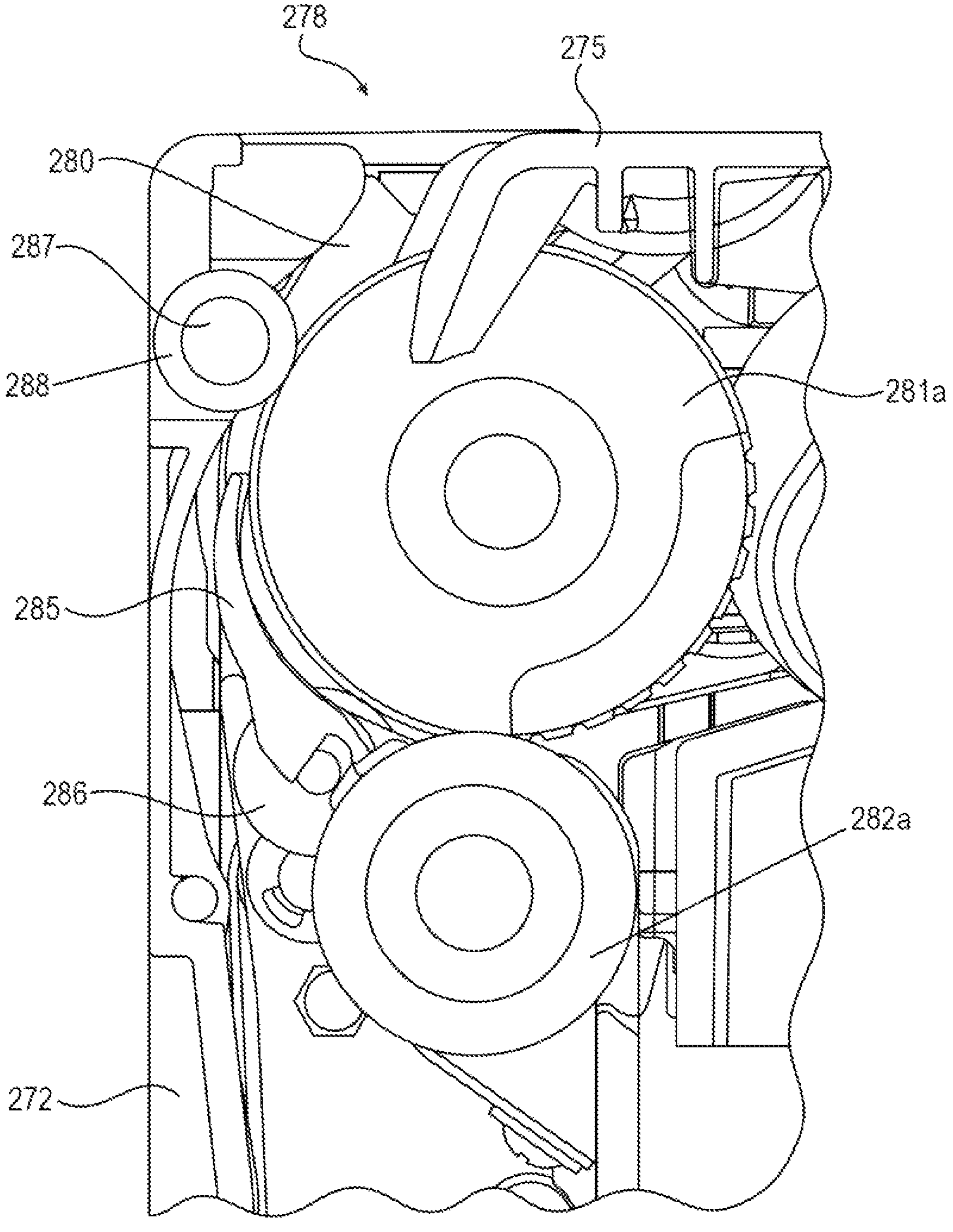
FIG. 18 is an enlarged portion of FIG. 17.
Figure 19:
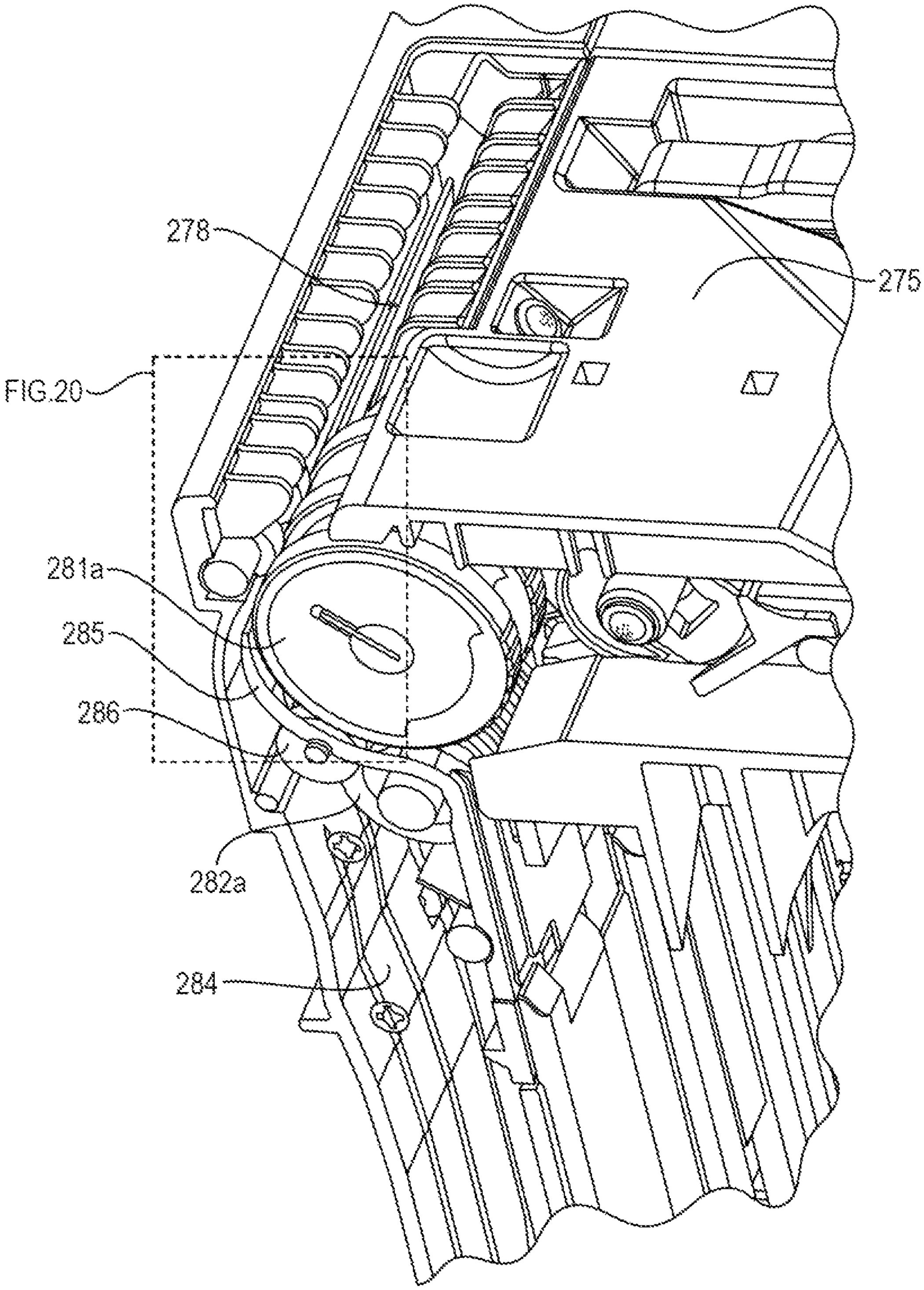
FIG. 19 is a partial right end cross-sectional perspective view of the cassette of FIG. 16.
Figure 20:
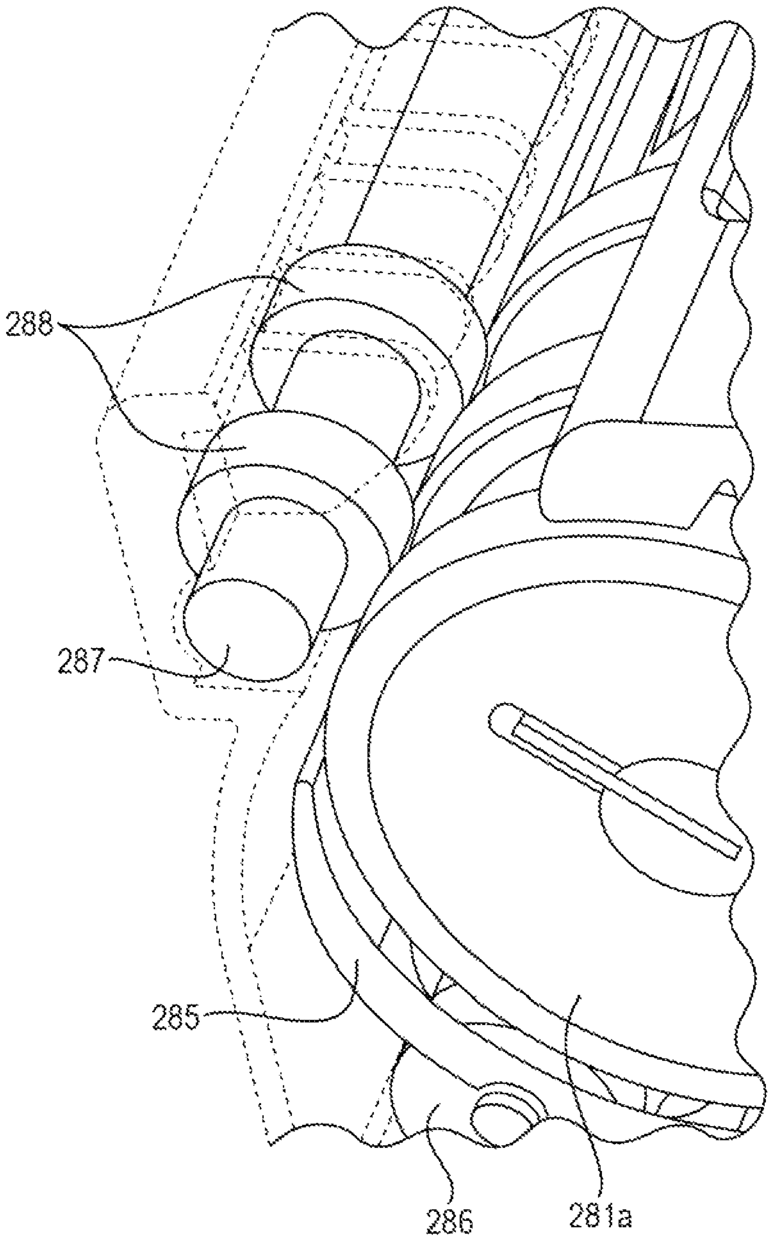
FIG. 20 is an enlarged portion of FIG. 19 partially in phantom.
Figure 21:
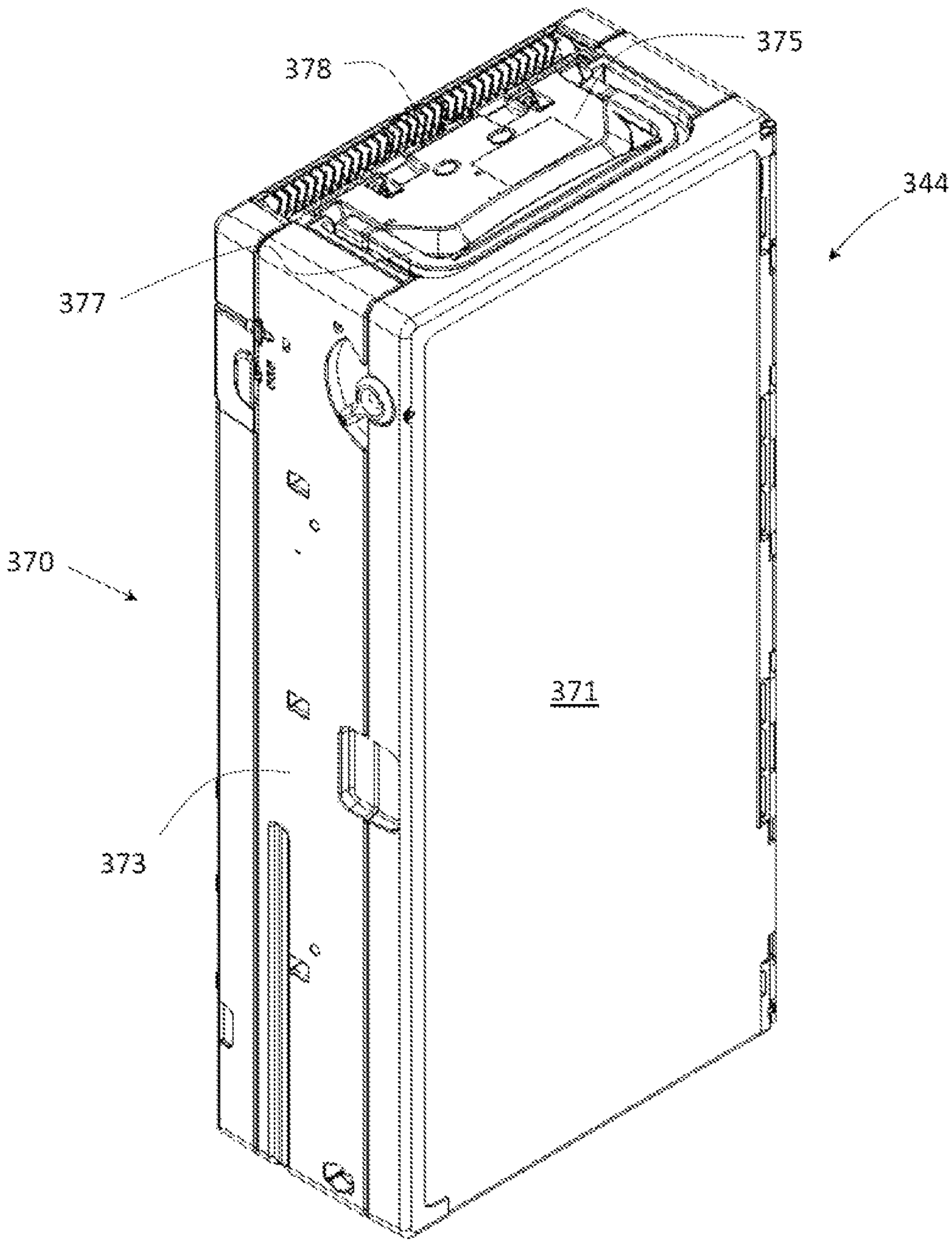
FIG. 21 is a top right perspective view of a third embodiment of a cassette of ATM of FIG. 1.
Figure 22:
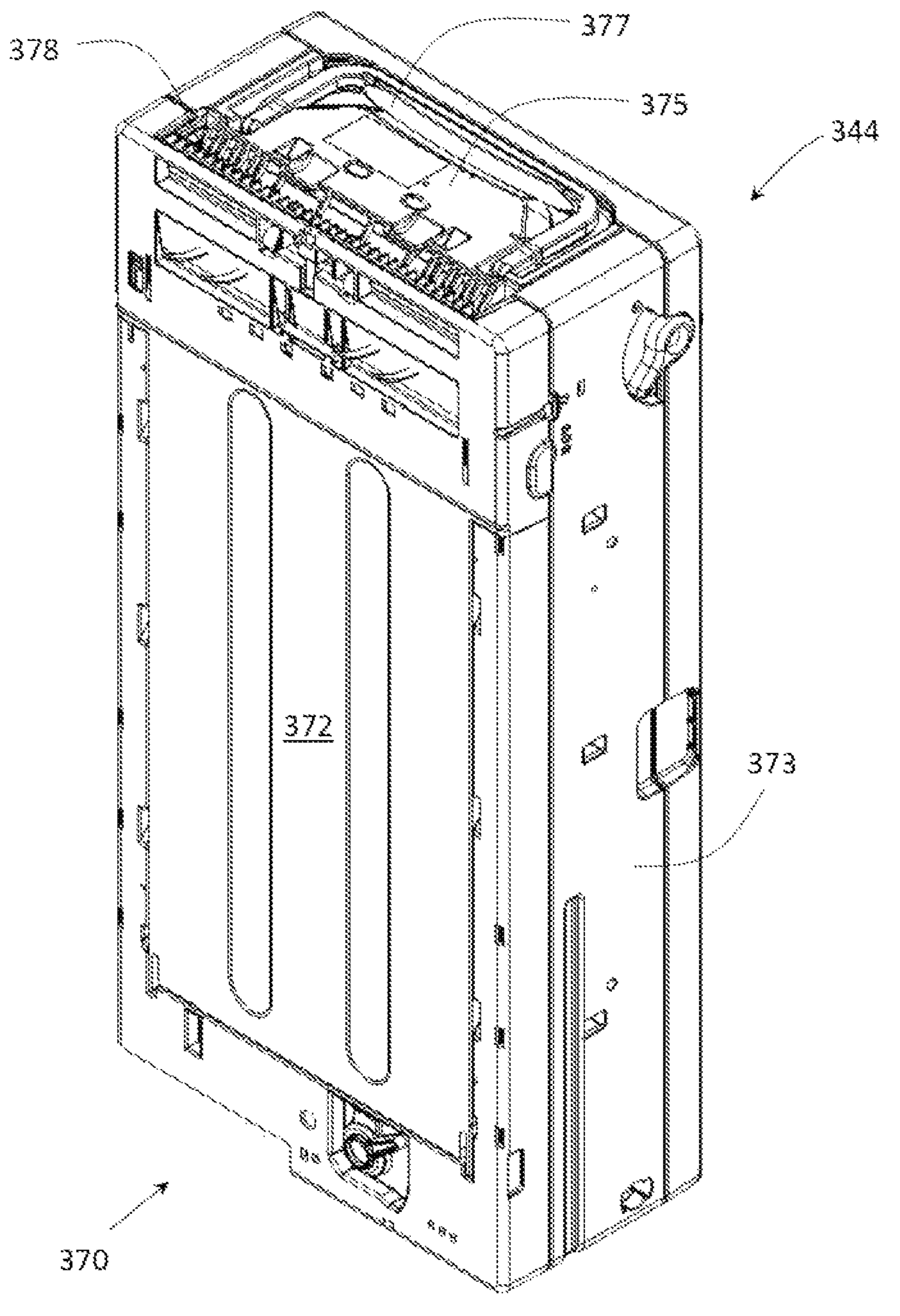
FIG. 22 is a bottom right perspective view of the cassette of FIG. 21.
Figure 23:
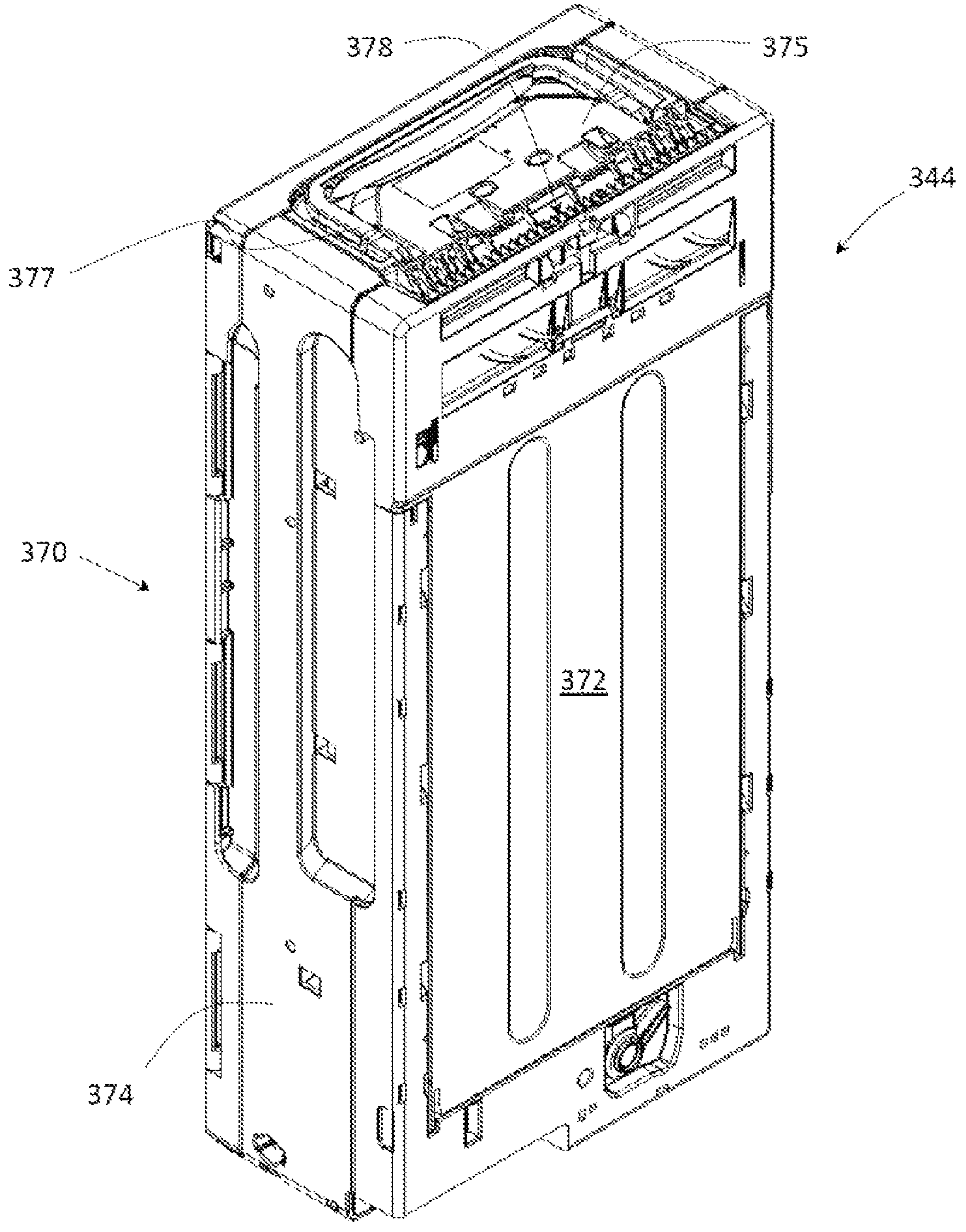
FIG. 23 is a bottom left perspective view of the cassette of FIG. 21.
Figure 24:
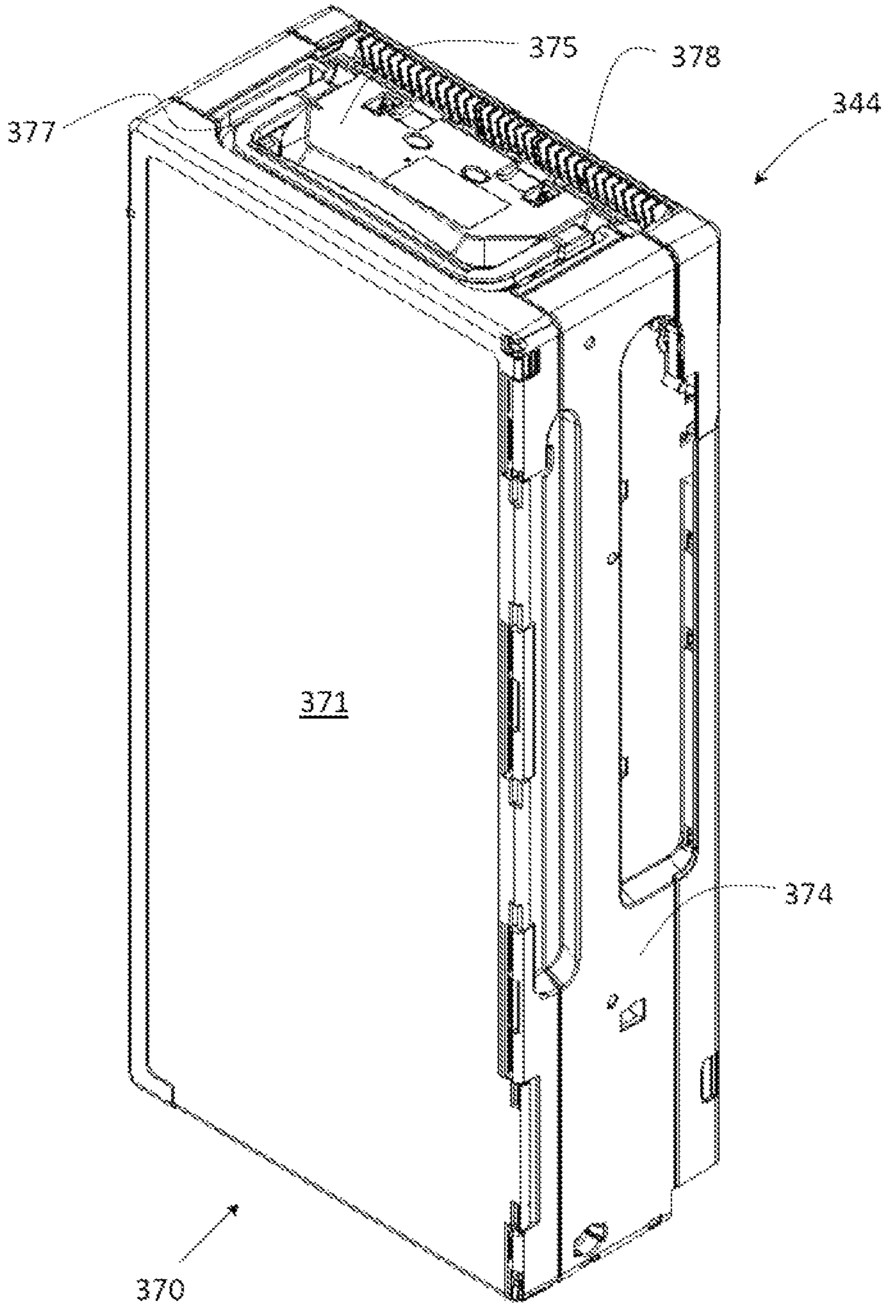
FIG. 24 is a top left perspective view of the cassette of FIG. 21.
Figure 25:
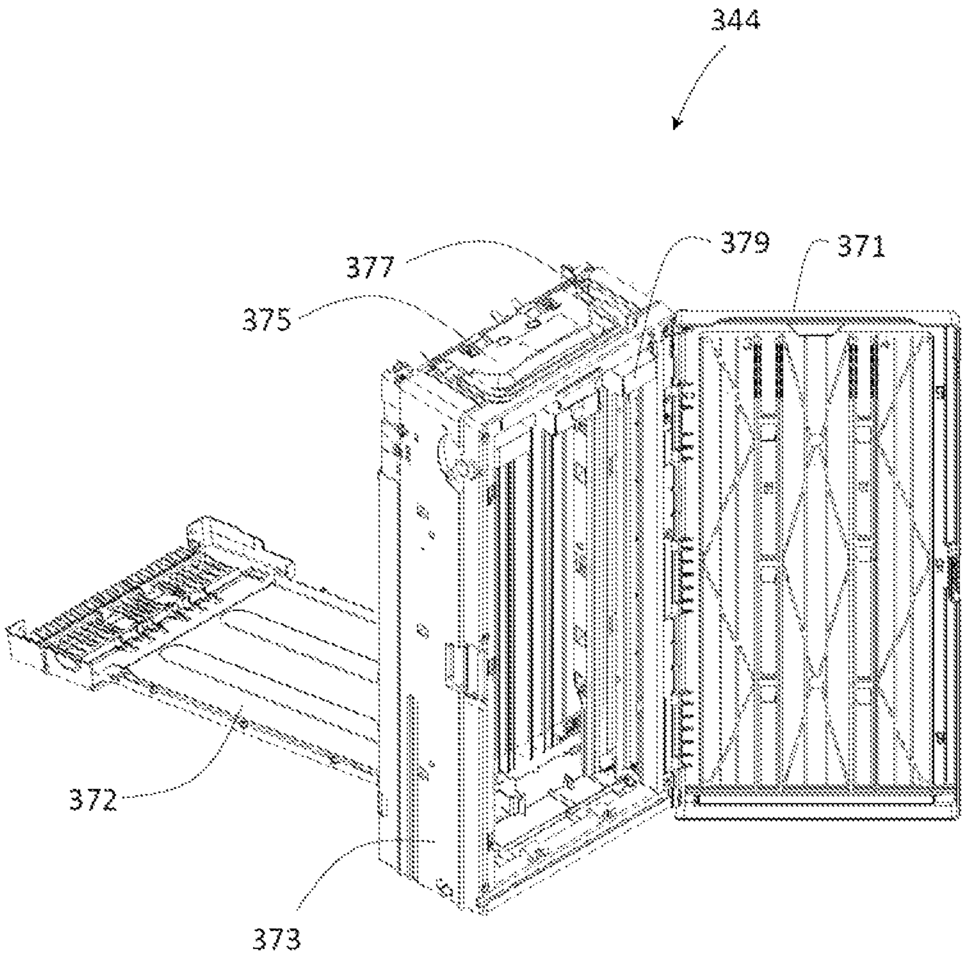
FIG. 25 is a view similar to FIG. 21 except showing the top lid and the bottom lid in open positions.
Figure 26:
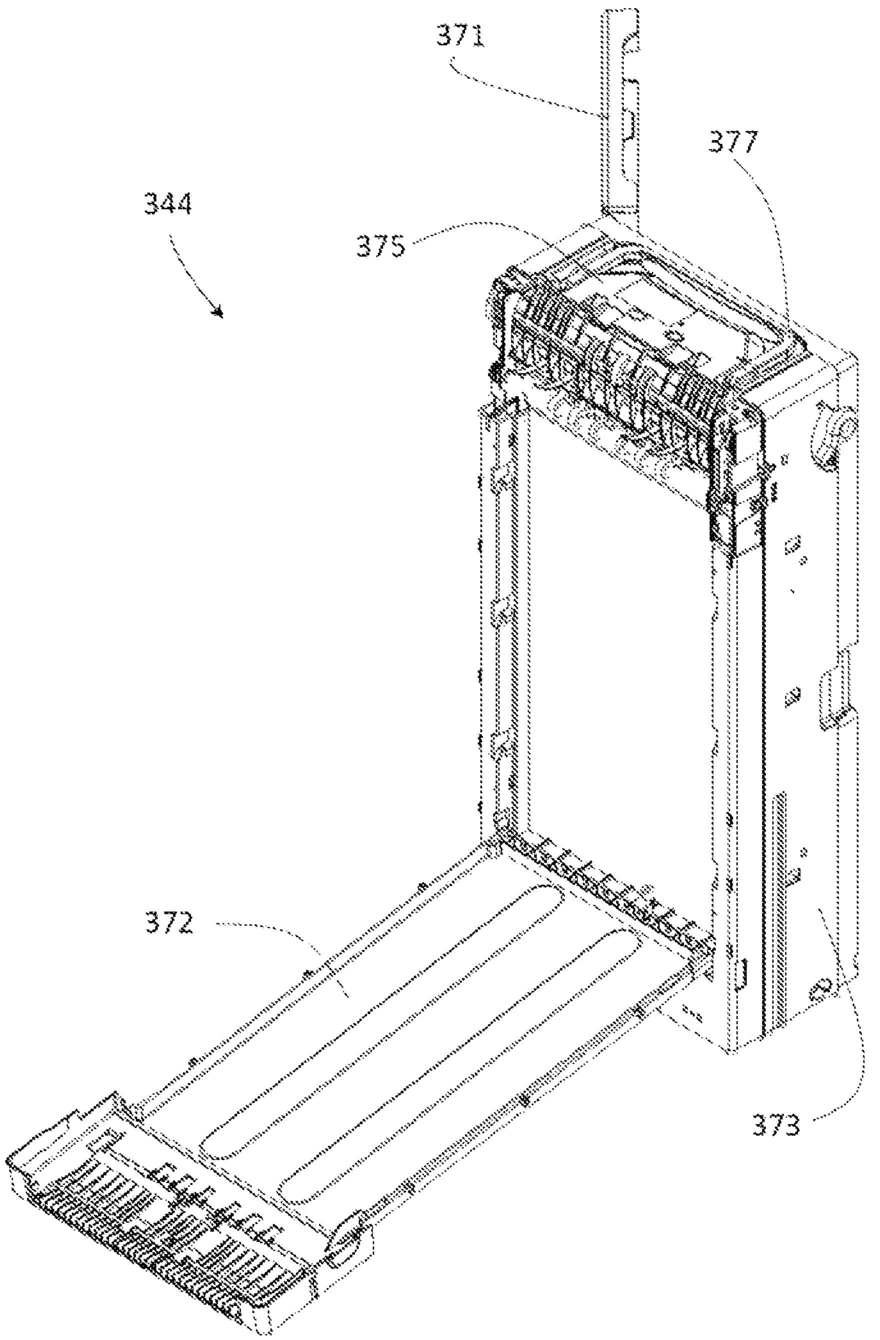
FIG. 26 is a view similar to FIG. 22 except showing the top lid and the bottom lid in open positions.
Figure 27:
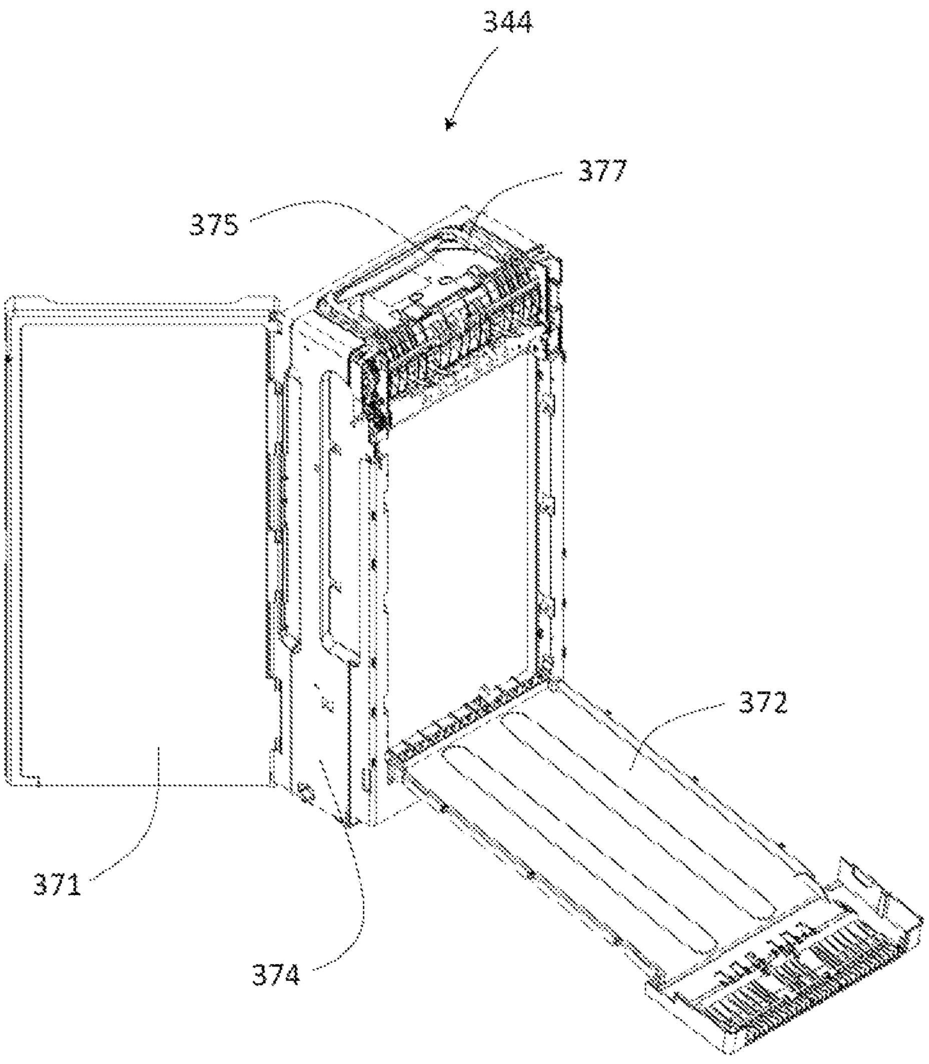
FIG. 27 is a view similar to FIG. 23 except showing the top lid and the bottom lid in open positions.
Figure 28:
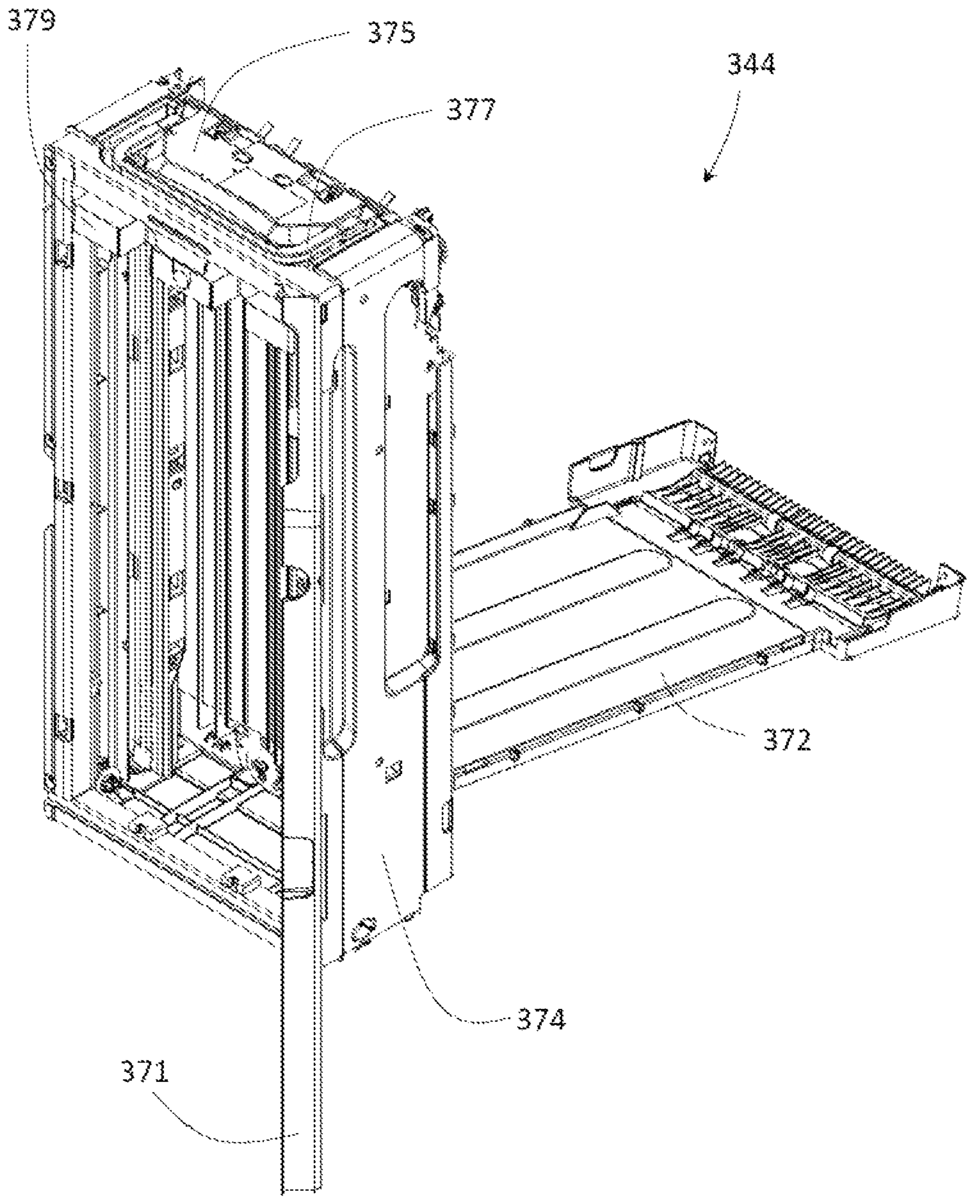
FIG. 28 is a view similar to FIG. 24 except showing the top lid and the bottom lid in open positions.

Further, as best shown in FIGS. 18-20, toward the upper end 275 the cassette 244 defines a throat 280 between the slot 278 and a gate 285 for selectively connecting the upper pathway and the throat 280 and the lower pathway and the throat 280.

There is a take-away wheel 286 disposed behind the gate 285.

There is a pinch shaft 287 having pinch wheels 288 disposed there on disposed in the throat 280 proximate the slot 278.

FIGS. 21-29 illustrate a third embodiment of a cassette 344 for use in the ATM 10. The cassette 344 of the third embodiment has an exterior generally similar to the exterior of the cassettes 144 and 244 of the first and second embodiments as illustrated in FIGS. 9-12. The cassettes 144, 244, and 344 are all configured to be disposed in the core module 41 and operate with the ATM 10.

The cassette 344 has a shell 370 including a top 371, a bottom 372, a right side 373, a left side 374, a front end 375 and a rear end. The cassette 344 is operable to both dispense or accept notes or other documents. Thus, the cassette 344 may be referred to and an In-Out Cassette, a Recycling Cassette, or a Two-Way Cassette.

The front end 375 includes an optional handle 377 and there is a slot 378 formed in the front end 375 to provide for the passage of notes or other documents between the inside and outside of the cassette 344.

The cassette 344 defines an internal cavity for the storage of notes or other documents. A push plate 379 for urging the documents toward the slot 378 is disposed in the cavity. The push plate 379 may be spring biased, motorized, or both. In this embodiment, the top 371 is a hinged top lid to provide access to the internal cavity.

Figure 29:
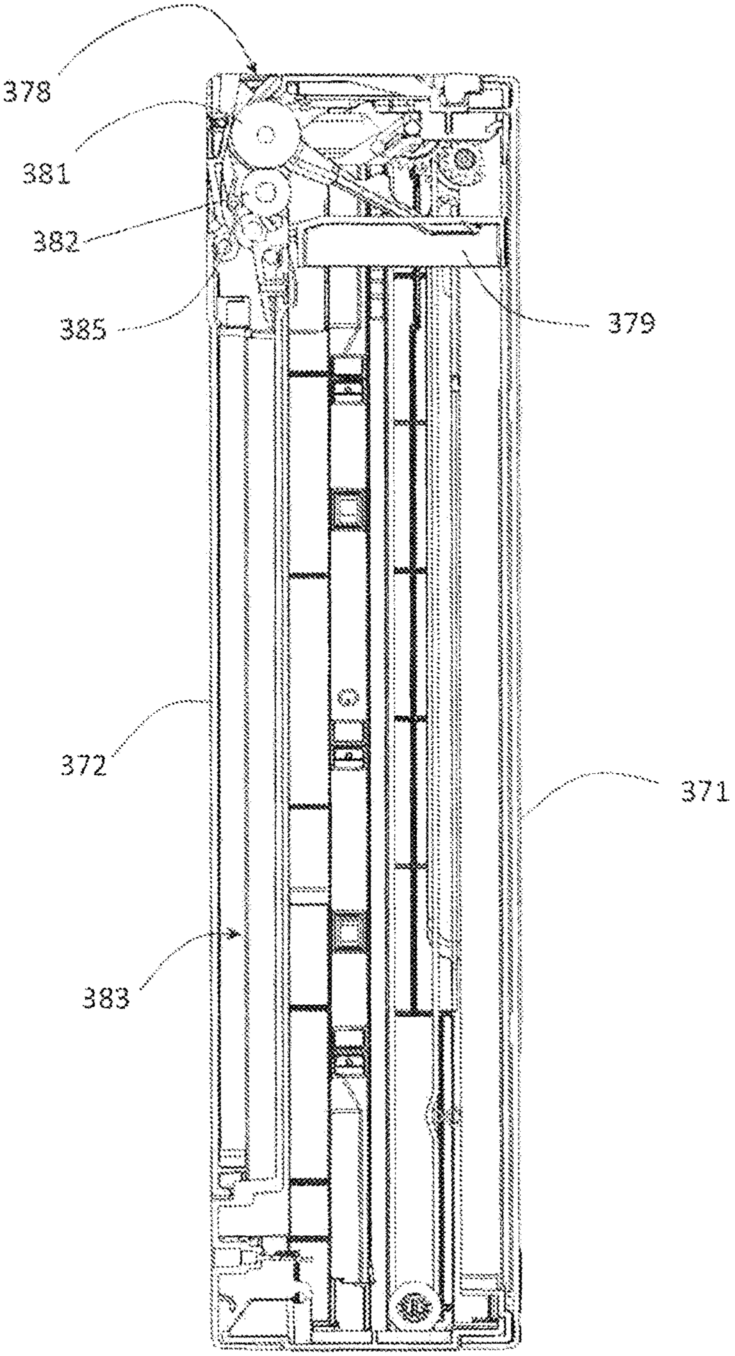
FIG. 29 is a is a right cross-sectional view of the cassette of FIG. 21.

A pathway for the notes or documents to traverse between the cavity and the slot 378 includes a throat, a feed wheel 381, and a stripper wheel 382 among other components shown in FIG. 29.

It is noted that the cassette 344 defines a space 383 between the bottom 372 and a floor of the cavity. In this embodiment the space 383 is configured as a one-way storage and may be referred to as a deposit only store, dump bin, reject bin, or other in only storage. Further, in this embodiment, the bottom 372 is a hinged bottom lid to provide access to the space 383.

Further, as best shown in FIG. 29, toward the upper end 375 the cassette 344 includes a gate 385 for selectively connecting the pathway and the throat and the space 383 and the throat, such that documents may be directed in and out of the cavity or into the space 383. In this embodiment, the bottom 372 is a hinged bottom lid to provide access to the internal space 383.

Figure 30:
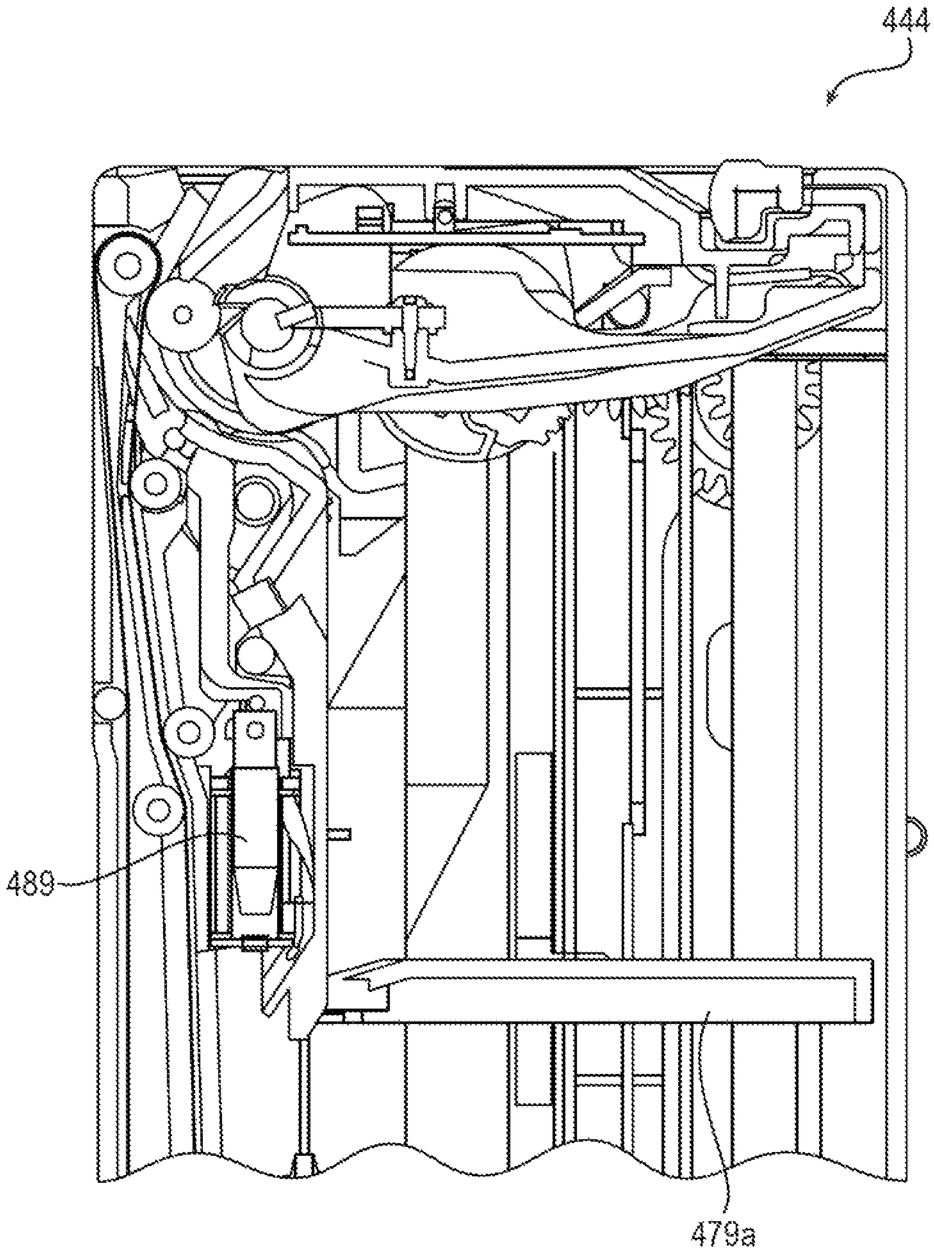
FIG. 30 is a view similar to FIG. 17 of a fourth embodiment of a cassette similar to the second embodiment except including a solenoid.

FIG. 30 illustrates a fourth embodiment of a cassette 444 for use in the ATM 10. The cassette 444 of the fourth embodiment is generally identical to the cassette 244 of the second embodiment except that the cassette 444 of the fourth embodiment includes a solenoid 489 for selectively switching a gate 485.

Figure 31:
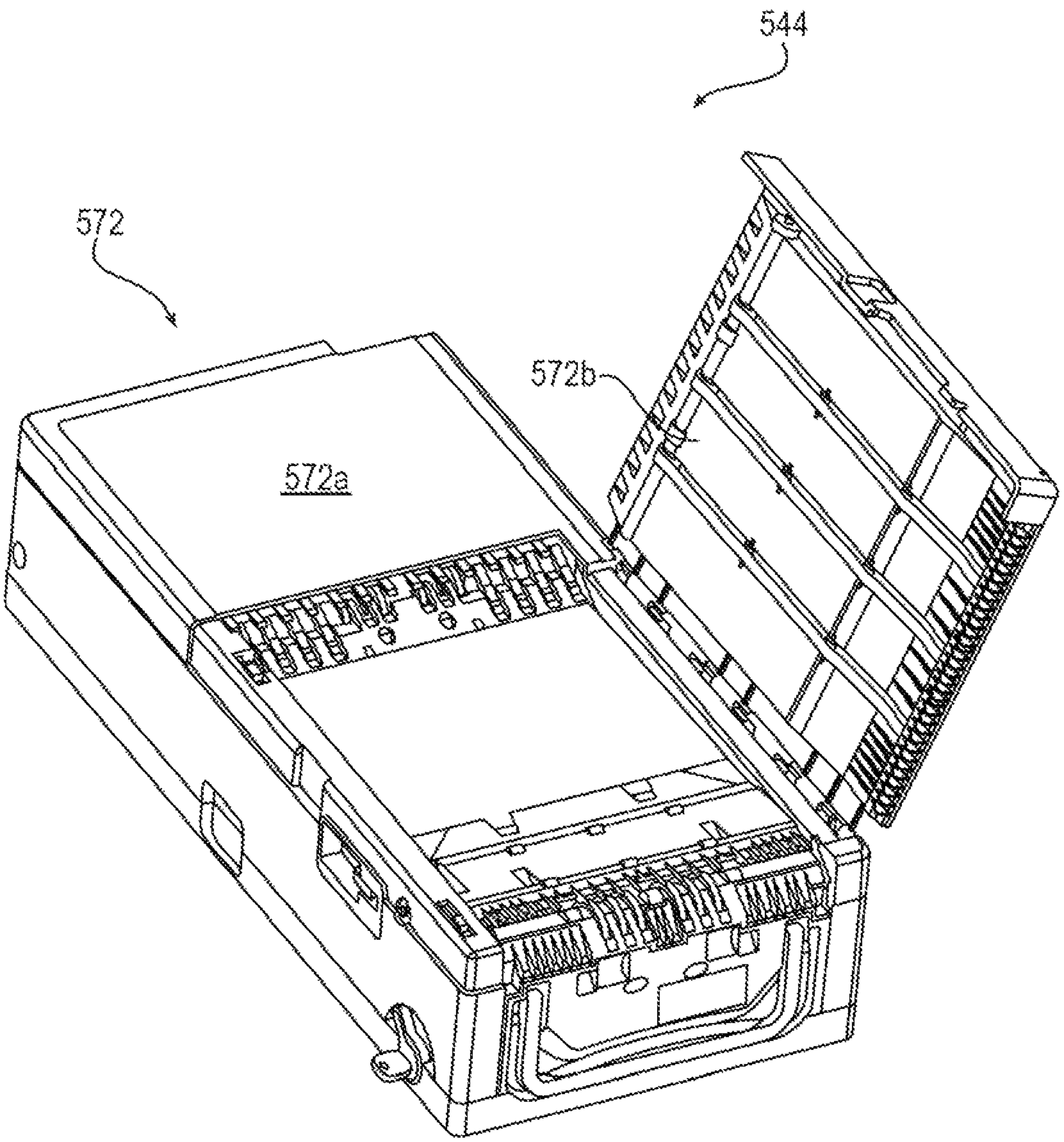
FIG. 31 is a bottom lid open.
Figure 32:
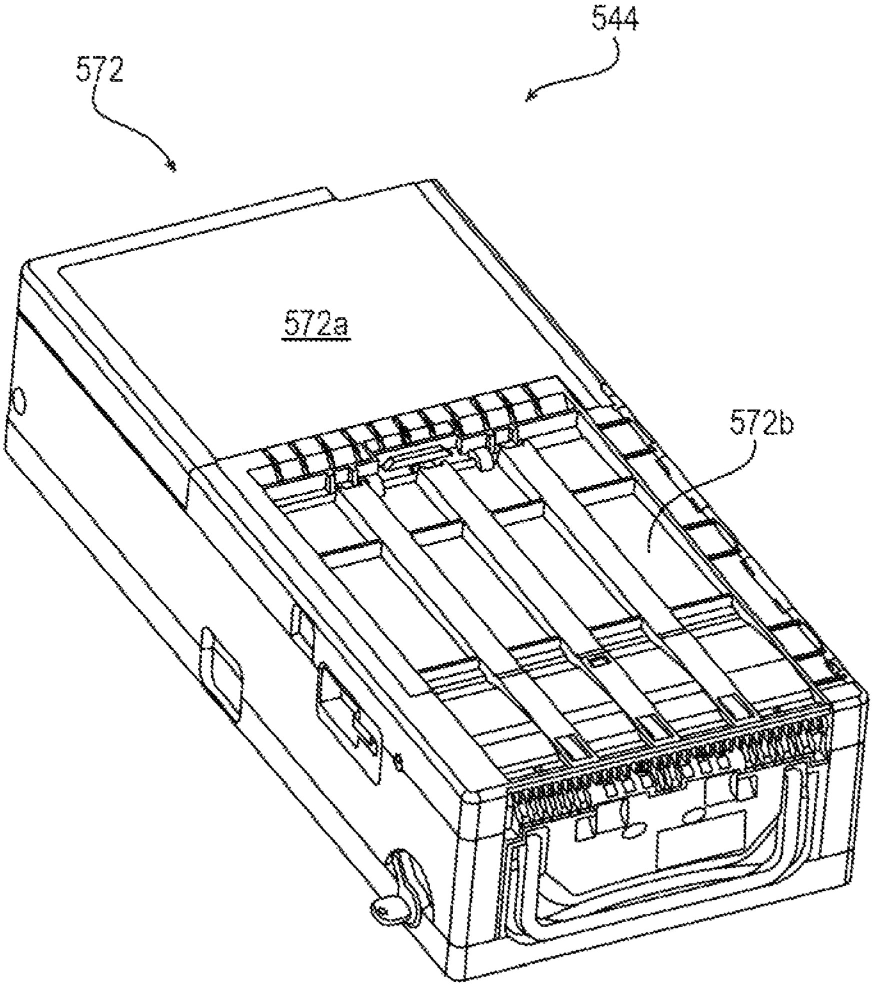
FIG. 32 is a bottom lid closed.

FIGS. 31 and 32 illustrate a fifth embodiment of a cassette 544 for use in the ATM 10. The cassette 544 of the fifth embodiment is generally identical to the cassette 244 of the second embodiment except that in the case of the cassette 544 of the fifth embodiment the bottom 572 includes a first portion 572*a* that is generally a fixed bottom portion and a second portion 572*b* that is a bottom lid portion to provide access to the internal transport.

It must be understood that it is intended the features and elements shown and described across the multiple embodiments may be combined or included in multiple combinations and examples described herein are not intended to be limiting with regard to the multiple combinations.

While principles and modes of operation have been explained and illustrated with regard to particular embodiments, it must be understood, however, that this may be practiced otherwise than as specifically explained and illustrated without departing from its spirit or scope.

What is claimed is:

1. An automated transaction machine ("ATM") comprising:
- a secure chest;
- a core module including a plurality of commonly-configured cassette bays and disposed in the secure chest;
- a first cassette of a first configuration disposed in a first bay of the plurality of commonly-configured cassette bays, the first cassette having:
  - a first shell including a first front end and an upper cavity with a first floor and a lower cavity, where the first shell defines a first slot for the passage of documents between an inside and an outside of the first shell and is formed in the first front end,
  - respective push plates disposed in the upper cavity and the lower cavity for urging documents disposed therein toward the first slot,
  - a first gate positioned along both of an upper pathway that extends between the first slot and the upper cavity and a lower pathway that extends between the first slot and the lower cavity, and
  - a first throat defined between the first slot and the first gate, wherein the first gate selectively connects the upper pathway and the first throat and the lower pathway and the first throat; and
- a second cassette of a second configuration disposed in a second bay of the plurality of commonly-configured cassette bays, the second cassette having:
  - a second shell including a second top, a second bottom, a second front end, and a second cassette main cavity having a second floor is defined within the second shell,
  - a second slot for the passage of documents between the inside and outside of the second shell is formed in the second front end,
  - an internal space within the second shell for the storage of documents, the internal space disposed between the second bottom and the second floor of the second cassette main cavity,
  - where the second top of the second shell is a second top lid providing access to the second cassette main cavity, and
  - where the second bottom of the second shell includes a hinged second bottom lid portion providing access to at least a portion of the internal space.

2. The ATM of claim 1 wherein the core module further comprises:
- a lower tray that defines the plurality of commonly-configured cassette bays, the lower tray including first and second support rails where at least one of the first and second support rails is spaced from the plurality of commonly-configured cassette bays by a sloped guide surface.

3. The ATM of claim 2 wherein the first and second guide rails are off set from one another in vertical displacement and the sloped guide surface is lower than one of the first and second guide rails.

4. The ATM of claim 2 wherein the core module further comprises:
- a dispenser mechanism hinged to the lower tray such that the dispenser mechanism hinges open, away from at least one of the first and second guide rails to allow for insertion of the first and second cassettes.

5. The ATM of claim 1 further comprising:
- an upper feed wheel and an upper stripper wheel positioned along the upper pathway including for traversing documents in and out of the upper cavity.

6. The ATM of claim 1 further comprising:
- a pinch wheel positioned to extend into the first throat downstream of the first gate, wherein the upper feed wheel also extends into the first throat downstream of the first gate opposite to the pinch wheel.

7. The ATM of claim 6 further comprising:
- an upper feed wheel and an upper stripper wheel positioned along the upper pathway including for traversing documents in and out of the upper cavity.

8. A cassette for an automated transaction machine comprising:
- a shell including a top, a bottom, a right side, a left side, a front end, and a rear end, where an upper cavity with a floor and a lower cavity are defined within the shell, where the shell defines a slot for the passage of documents between an inside and an outside of the shell and is formed in the front end;
- an upper push plate disposed in the upper cavity configured to urge documents disposed therein toward the slot;
- a lower push plate disposed in the lower cavity for urging documents disposed therein toward the slot;
- an upper pathway including an upper feed wheel and an upper stripper wheel for traversing documents in and out of the upper cavity;
- a lower pathway including a lower feed wheel and a lower stripper wheel for traversing documents in and out of the lower cavity;
- a gate positioned along both of the upper pathway and the lower pathway;

a throat defined between the slot and the gate, wherein the gate selectively connects the upper pathway and the throat and the lower pathway and the throat;

an internal transport disposed between the bottom of the shell and the floor of the upper cavity, the internal transport configured to convey documents to and from the lower cavity; and a pinch wheel positioned to extend into the throat downstream of the gate, wherein the upper feed wheel also extends into the throat downstream of the gate opposite to the pinch wheel.

9. The cassette of claim 8 further comprising a pinch shaft upon which the pinch wheel is disposed.

10. The cassette of claim 8 further comprising a take-away wheel disposed behind the gate.

11. The cassette of claim 8 further comprising a handle formed in the front end of the cassette.

12. The cassette of claim 8 where at least one of the upper and lower push plates are spring biased.

13. The cassette of claim 8 where at least one of the upper and lower push plates are motorized.

14. The cassette of claim 8 further comprising a solenoid for selectively switching the gate.

15. The cassette of claim 8 where the bottom includes a hinged bottom lid portion to provide access to the internal transport.

16. A cassette for an automated transaction machine comprising:

a shell including a top, a bottom, a right side, a left side, a front end, and a rear end, where a cavity is defined within the cassette, and where a slot for the passage of documents between the inside and outside of the shell is formed in the front end; where the cavity includes a main cavity for the storage of documents between the top and a floor in the cavity, and an internal space between the floor and the bottom;

an upper pathway extending between the upper cavity and the slot;

a lower pathway extending between the internal space and the slot;

a gate;

a throat between the slot and the gate, the gate configured to selectively connect the upper pathway and the throat and the lower pathway and the throat;

where the top of the shell is a top lid providing access to the main cavity, and where the bottom of the shell includes a hinged second bottom lid portion providing access to at least a portion of the internal space.

17. The cassette of claim 16 further comprising a push plate disposed in the upper cavity for urging documents disposed therein toward the slot.

18. The cassette of claim 16 further comprising:

a feed wheel and a stripper wheel for traversing documents in and out of the upper cavity.

* * * * *